(12) United States Patent
Keller

(10) Patent No.: US 7,961,835 B2
(45) Date of Patent: Jun. 14, 2011

(54) HYBRID INTEGRATED ENERGY PRODUCTION PROCESS

(76) Inventor: Michael F. Keller, Overland Park, KS (US)

(*) Notice: Subject to any disclaimer, the term of this patent is extended or adjusted under 35 U.S.C. 154(b) by 0 days.

(21) Appl. No.: 11/213,142

(22) Filed: Aug. 26, 2005

(65) Prior Publication Data
US 2007/0280400 A1 Dec. 6, 2007

(51) Int. Cl.
*G21C 23/00* (2006.01)

(52) U.S. Cl. ........ 376/317; 376/319; 376/322; 376/324; 376/383

(58) Field of Classification Search .............. 60/644, 60/682, 652, 39.02, 39.182, 39.05, 39.12; 431/170; 376/317
See application file for complete search history.

(56) References Cited

U.S. PATENT DOCUMENTS

| | | | |
|---|---|---|---|
| 2,186,706 A | 1/1940 | Martinka | |
| 2,482,791 A | 9/1949 | Nettel | |
| 2,567,581 A | 9/1951 | Salter | |
| 2,584,232 A | 2/1952 | Sedille | |
| 2,625,012 A | 1/1953 | Larrecq | |
| 2,626,502 A | 1/1953 | Lagelbauer | |
| 2,633,707 A | 4/1953 | Hermitte et al. | |
| 2,655,364 A | 10/1953 | Maldague | |
| 2,758,827 A | 8/1956 | Pfenninger | |
| 3,048,018 A | 8/1962 | Nicolin | |
| 3,220,191 A * | 11/1965 | Berchtold | 60/682 |
| 3,325,992 A | 6/1967 | Sheldon | |
| 3,410,091 A | 11/1968 | Frutschi | |
| 3,715,887 A | 2/1973 | Weatherly et al. | |
| 3,748,228 A | 7/1973 | Zimmerman | |
| 3,788,944 A | 1/1974 | Stracke | |
| 3,951,737 A | 4/1976 | Frutschi et al. | |
| 3,962,864 A | 6/1976 | Williams et al. | |
| 4,021,299 A * | 5/1977 | Rigollot | 376/322 |
| 4,193,266 A | 3/1980 | Frutschi | |
| 4,229,257 A * | 10/1980 | Forster | 376/391 |
| 4,353,214 A * | 10/1982 | Gardner | 60/652 |
| 4,368,616 A | 1/1983 | Abo et al. | |
| 4,441,028 A * | 4/1984 | Lundberg | 290/52 |
| 4,537,023 A | 8/1985 | Nakamura et al. | |
| 4,686,832 A | 8/1987 | Miliaras | |
| 4,745,868 A | 5/1988 | Seabury | |

(Continued)

FOREIGN PATENT DOCUMENTS
WO WO 96/01942 * 1/1996

OTHER PUBLICATIONS
Doctor et al., KRW Oxygen-Blow Gasification Combined Cycle: Carbon Dioxide Recovery, Transport and Disposal, ANL/EDS-34, Aug. 1996.*

(Continued)

*Primary Examiner* — Rick Palabrica
(74) *Attorney, Agent, or Firm* — Erickson, Kernell, Derusseau & Kleypas, LLC

(57) ABSTRACT

Disclosed is an advanced process that relates to the enhanced production of energy using the integration of multiple thermal cycles (Brayton and Rankine) that employ multiple fuels, multiple working fluids, turbines and equipment. The method includes providing a nuclear reactor, reactor working fluid, heat exchangers, compressors, and multiple turbines to drive compressors that pressurize a humidified working fluid that is combusted with fuel fired in at least one gas turbine. The turbine(s) provide for electrical energy, processes or other mechanical loads.

8 Claims, 11 Drawing Sheets

U.S. PATENT DOCUMENTS

| | | | |
|---|---|---|---|
| 4,756,873 A * | 7/1988 | Schoening | 376/294 |
| 4,765,142 A | 8/1988 | Nakhamkin | |
| 4,829,763 A | 5/1989 | Rao | |
| 4,896,499 A | 1/1990 | Rice | |
| 5,105,617 A | 4/1992 | Malohn | |
| 5,121,607 A * | 6/1992 | George, Jr. | 60/712 |
| 5,309,492 A * | 5/1994 | Adams | 376/381 |
| 5,347,806 A | 9/1994 | Nakhamkin | |
| 5,361,377 A * | 11/1994 | Miller | 376/211 |
| 5,704,209 A * | 1/1998 | Bronicki et al. | 60/650 |
| 5,822,974 A | 10/1998 | McGowin et al. | |
| 5,924,283 A * | 7/1999 | Burke, Jr. | 60/325 |
| 6,038,849 A | 3/2000 | Nakhamkin et al. | |
| 6,305,158 B1 * | 10/2001 | Nakhamkin et al. | 60/39.53 |
| 6,644,013 B1 | 11/2003 | Hatamiya et al. | |
| 6,745,569 B2 * | 6/2004 | Gerdes | 60/727 |
| 2004/0060277 A1 * | 4/2004 | Hatamiya et al. | 60/39.53 |

OTHER PUBLICATIONS

McLain et al., "Close Cycle Nuclar Power Plant, in Reactor Handbook", Interscience Publication, 1964, p. 686-691.*

Rahn et al., "A guide to nuclear power technology" John Willey and Sons, NY, 1989, p. 251-252.*

Knief, Nuclear Engineering, Hemispheric Publisher Corporation, 1992, p. 691-692.*

J. Rahn, "A Guide to Nuclear Power Technology", Krieger Publishing Company, 1992, pp. 361-363.*

* cited by examiner

VI. Electrical Plant     I. Reactor Plant

HYBRID INTEGRATED ENERGY PRODUCTION PROCESS

BACKGROUND

The present invention relates to a new and improved process that integrates a nuclear closed-system regenerative gas turbine (Brayton) cycle, an open-system regenerative combustion turbine (Brayton) cycle, and Rankine steam cycles.

Prior art advanced nuclear power plants employing regenerative Brayton cycles, such as the Modular Helium Reactor (~600 thermal megawatts nuclear reactor) and the Pebble Bed Reactor (~265 thermal megawatts nuclear reactor), are designed to provide a high level of safety by employing passive reactor emergency cooling systems. However, in order to achieve this level of safety, the thermal output of the reactor must be limited, which in turn restricts electrical energy production. The relatively high capital cost of the technology causes the installed cost of the power plant to be less competitive relative to more conventional technologies, such as combined cycle gas turbine cycles, in spite of the lower cost of the nuclear fuel.

The above advanced nuclear power plants are capable of achieving thermal efficiencies approaching 50 percent and electrical outputs of approaching 270 megawatts. This contrasts with advanced combined cycle power plant cycles, such as those using steam cooled gas turbines, that possess thermal efficiencies approaching 60 percent or more and net outputs beyond 700 megawatts. While the advanced nuclear plant efficiencies are impressive relative to the mid-30-percent efficiencies of conventional light water nuclear reactor power plants, the combined cycle power plants remain the choice of the market place, in spite of the low fuel costs and minimal air pollution associated with advanced and conventional nuclear power plants.

Prior art and planned advanced nuclear power plants employ regenerative Brayton cycles that utilize turbines directly coupled to electrical generators. In the event of the sudden loss of the generator's electrical load, rapid and severe pressure and thermal transients can occur in the reactor systems. Special design features are required in order to avoid damage to the reactor.

Prior art gas turbines and combined cycle power plants typically employ electrical generators directly coupled to the gas turbine and compressors that pressurize the working fluid. This arrangement causes the rotating equipment to operate at a constant speed. In order to reduce the electrical output of the generator, the firing temperature of the gas turbine must be reduced and/or air flow restricted by means dampers. Both of these methods adversely impact the thermal efficiency of the power plant, thereby increasing the cost to operate the facility as the electrical load is reduced. The power market is such that wide variations in power plant load requirements are a typical situation.

Prior art gas turbines have been proposed to utilize waste heat from the Brayton cycle to add vapor into the turbine working fluid at points downstream from the air compressors, with the added mass of the working fluid used to increase the output of the gas turbine while also decreasing compressor power needs. In effect, these cycles combine a Rankine steam cycle in parallel with the Brayton cycle by evaporating water into the working fluid. In general, Brayton cycles become more efficient at higher working fluid pressures, which lead to corresponding higher compressor discharge temperatures. However, the humidification process is practically more effective at lower pressures. Further, the waste heat utilized by the evaporation process is, by definition, associated with lower temperatures from which useful energy could not otherwise be extracted.

Prior art combined cycle power plants can increase steam production (and ultimately, electrical generation) by combusting fuel using duct burners located in a heat recovery steam generator unit. However, the increased generation is at the expense of a reduction in overall thermal cycle efficiency because a single working fluid (water) and thermal cycle (Rankine steam cycle) are used.

Prior art advanced combined cycle power plants, while very efficient, still require large quantities of fuel fired in the gas turbines that drive the generators used to produce electrical energy as well as drive the compressors that pressurize the working fluid. The fuel can represent more than 70 percent of the cost to operate the facility. Fuel prices can be volatile, which can cause difficulties in the financial structure of the power plant investment.

The power industry is faced with increasingly restrictive regulations concerning all types of emissions as a result of the collective desire for a cleaner environment. These restrictions are becoming progressively more difficult for fossil fuel facilities to achieve.

Prior art coal gasification plants are able to achieve relatively clean air emissions when the fuel produced by the gasifier is fired in combustion turbines. However, the capital cost of the integrated gasification combined cycle (IGCC) plant is high, thus causing the cost of energy produced from the facilities to be marginally competitive, at best. In addition, the units can produce hydrogen for possible use as an energy source, but at high costs and with limited production capabilities.

Accordingly, there is a need to develop a more integrated solution to the above issues.

SUMMARY

The present invention demonstrates a process and system for combining a nuclear reactor-based, closed-system, regenerative Brayton thermal cycle with a gas turbine-based, open-system, regenerative Brayton thermal cycle and Rankine or steam cycles to create an integrated, advanced, hybrid facility for producing electric power or mechanical energy or supporting processes.

The present invention increases the electrical and/or mechanical capabilities of a nuclear power plant while retaining passive emergency heat removal capabilities of advanced nuclear reactors. In addition, another objective is to provide for emergency cooling of the reactor using power generation equipment, with decay heat removed from the reactor through heat exchangers and/or intercoolers. The present invention enhances the capability of the nuclear reactor to safely accommodate severe disturbances in the electrical grid.

In more detail, the present invention involves using a nuclear reactor to heat a compressed working fluid that is expanded by turbines that rotate a reactor plant's compressors, as well as air compressors of a compressor plant. Heat exchangers are used to transfer low-grade heat, from the working fluid, to the moisture addition equipment located downstream from the air compressor plant. In addition, intercooler heat exchangers are used to further cool the working fluid prior to entry into the compressors that pressurize the working fluid of the reactor plant, thereby reducing compressor power needs. A regenerative heat exchanger is used to pre-heat the working fluid, prior to re-entry into the reactor, by transferring heat from the hot working fluid discharged from the turbines.

The compressor plant includes multiple compressors used to pressurize the open-system working fluid to levels suitable for use with the gas turbines of a turbine plant. The working fluid is directed sequentially into low, intermediate and high pressure compressors from which the fluid is discharged into the moisture addition unit. Intercooler heat exchangers are used to cool the working fluid prior to entry into the compressor plant's intermediate and high pressure compressors, thereby reducing compressor power needs and optimizing the moisture addition process. A portion of this waste energy associated with cooling the air is used to heat water directed to a vapor addition unit, while the remaining waste energy is directed to heat sinks.

The vapor addition unit includes a vessel into which hot liquid fluid is sprayed and mixed with the relatively cool working fluid discharged from the compressor plant. Within the vessel, hot fluid is evaporated, thereby adding vapor as well as heat to the working fluid that is subsequently directed to a heat recovery unit. The vapor addition unit allows for the direct integration of a Rankine steam cycle into the Brayton or gas turbine cycle.

The heat recovery unit includes a series of heat exchangers past which flow hot combusted vapors discharged from the gas turbine. Included are regenerative heat exchangers that add energy to the moisturized working fluid discharged from the vapor addition unit. The regenerative heat exchanger decreases the fuel requirements of the gas turbine by increasing the temperature of the working fluid prior to combustion. The heated, vapor-laden working fluid is then directed into the gas turbine. Additional heat can also be added to the gas turbine exhaust by firing duct burners located within the heat recovery unit. The heat recovery unit also transfers waste energy into fluid discharged from heat exchangers located in the reactor plant, with the heated fluid then directed to the vapor addition unit. The heat recovery unit also transfers gas turbine exhaust heat to water that is transformed into vapors and subsequently used by a steam turbine. The preceding represents another Rankine cycle, but in this case, the steam cycle is sequentially coupled after the open-system, Brayton cycle.

The turbine plant includes a gas turbine and a steam turbine. In the case of the gas turbine, fuel is combined with moisture-laden, pressurized air from the compressor plant, then is ignited and directed into rotating turbine blades. Combustion products exhausted from the gas turbine are directed into the heat recovery unit. A steam turbine provides cooling vapors to the gas turbine, with the vapors created within the heat recovery unit. Vapors exhausted from the steam turbine are typically condensed for re-use.

The electric plant includes two generators driven by the gas and steam turbines. The gas turbine generator is not coupled to the compressor plant during normal operation. However, a clutch is provided to support start-up of the reactor's turbine and the gas turbine by temporarily using the generator as a motor. The generator/motor mode can also be used for indirectly cooling the reactor by rotating the compressors and removing heat through the reactor plant's intercoolers and heater exchangers associated with the vapor addition unit.

Vapor in the exhaust from the gas turbine is recovered within the heat recovery unit for re-use in the vapor addition unit by employing a water cooled heat exchanger and/or sprays to condense the water vapor.

Control of the power generated by the facility is achieved largely within the reactor plant and vapor addition unit by altering the mass flow of the working fluid. The rotating speed of the compressors is thus altered, which subsequently causes the energy output of the gas turbine to change, thereby altering the output of the primary electrical generator.

The reactor plant includes an accumulator/receiver vessel located between the discharge of the high-pressure compressor and lower pressure discharge piping from the regenerator heat exchanger. The accumulator/receiver allows for altering the density of the reactor plant's working fluid, thereby affecting both the mass flow and the pressure of the working fluid. The variable density of the reactor plant's working fluid allows for altering the speed of the turbine, which in turn varies the speed of the air compressors of the compressor plant which alters the mass flow through the constant speed gas turbine. This arrangement provides for minimal impacts on the efficiency of the overall process, within the operational limits of the compressors.

Additional control of the output of the gas turbine's electrical generator can be achieved by altering the amount of fluid sprayed into the vapor addition unit, thereby altering the flow of moisture laden vapors through the gas turbine. The energy output of the gas turbines is also affected by the quantity of vapor in the working fluid.

In the event of a sudden, complete loss of electrical load by the gas turbine's generator, reactor power is reduced at a controlled rate while the gas turbine's pressurized open-system working fluid is discharged to the atmosphere from the compressor plant. The compressors are not coupled to the gas turbine's electrical generator and as such reactor operations can be reduced as safety and design capabilities warrant. Also, an accumulator/receiver is provided between the gas turbine and steam turbine to provide temporary emergency cooling of the gas turbine in the event of the sudden loss of the steam turbine that normally supplies cooling steam to the gas turbine.

A variation of the present invention, in more detail relative to coal gasification, the facility described above can be configured to provide steam and compressed air to a coal gasification facility that then produces oxygen from the compressed air, creates a fuel gas by combining the coal, steam and oxygen and then cleans the fuel gas. This gas can be used by the gas turbine of the hybrid nuclear facility. In addition, the gasification plant can provide energy for vapor and steam production within the hybrid nuclear facility.

A further adaptation of the nuclear integrated coal gasification process using the hybrid nuclear turbine is to employ an electrolysis plant to provide the oxygen needed by the gasifier, in lieu of compressed air from the hybrid nuclear facility's air compressor. The electrolysis co-product, hydrogen, would be sold by the integrated energy production facility. Additionally, the nuclear plant can provide heat to the electrolysis plant to increase the efficiency of hydrogen production, thereby decreasing the cost of the product.

DETAILED DESCRIPTION

Figure 1:
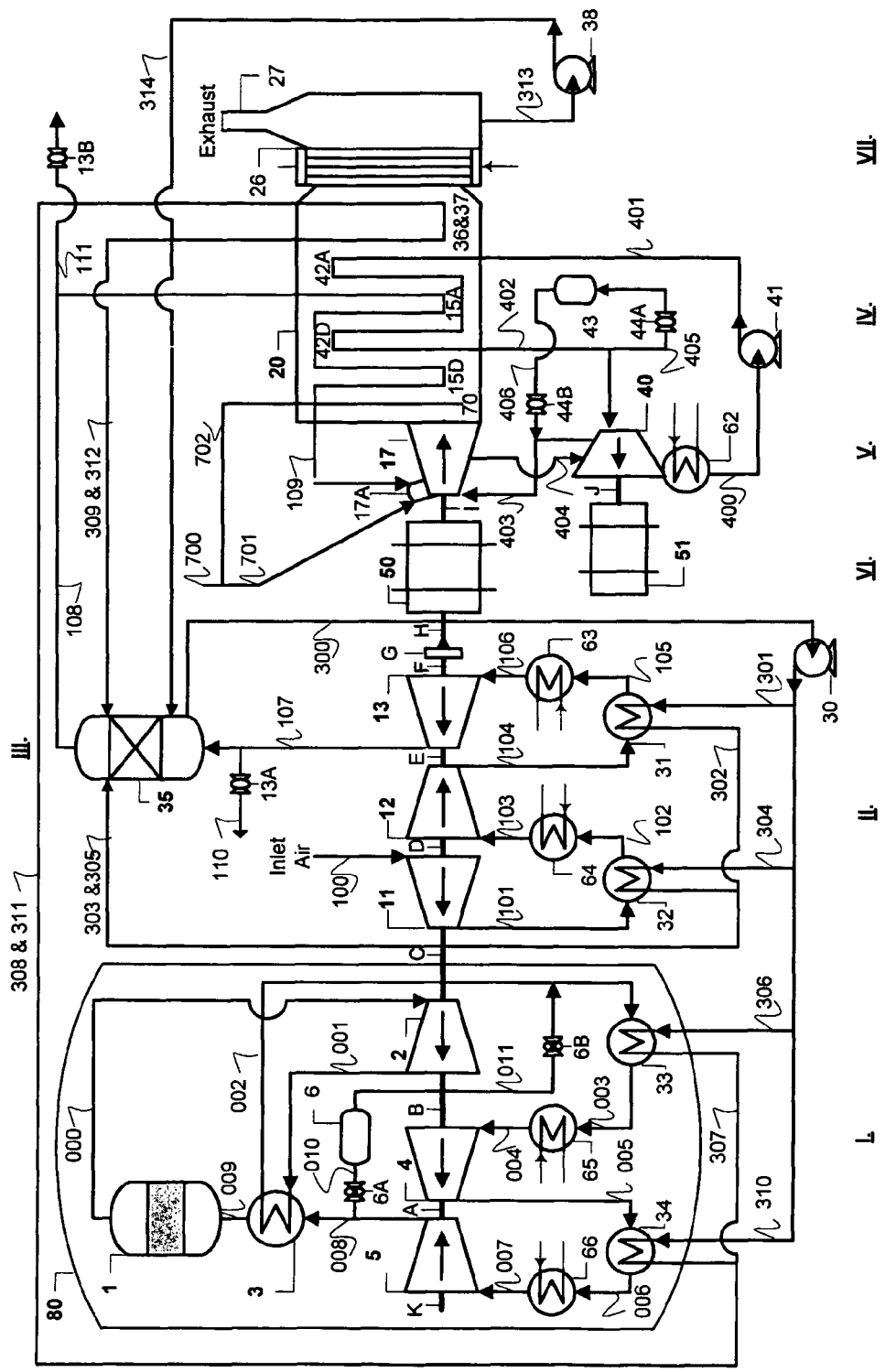
FIG. 1 is an overall process diagram of the present invention.

Referring initially to FIG. 1, a process for producing power is illustrated utilizing a Reactor Plant I, Compressor Plant II, Vapor Addition Unit III, Heat Recovery Unit IV, Turbine Plant V, Electrical Plant VI, and Water Recovery Unit VII. The actual physical sequential alignment and arrangement of the equipment, interconnecting rotating shafts and/or spools, as well as interconnecting ductwork will vary depending on the specific desired configuration of the processes using the rotational energy provided by the invention. In particular, those skilled in the art will recognize that variations of this invention include selectively coupling through spooling and shafting groups of compressors and turbines. For instance, the low-pressure compressors of the closed-system, the compressors of the open-system, and several stages of the closed-system turbine could be mounted on a single shaft with the high-pressure compressor of the closed-system coupled through spooling to the remaining stages of the closed-system turbine, thus allowing the compressor sets to rotate at different but optimized conditions.

Figure 1A:
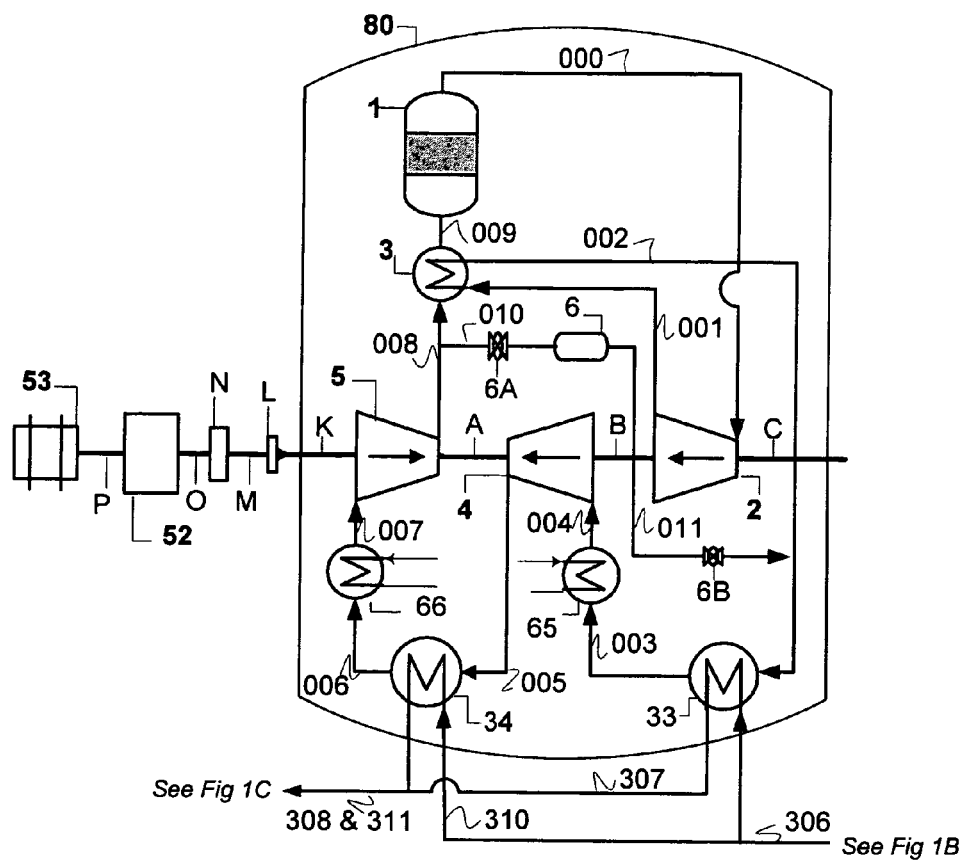
FIG. 1A is a process diagram of the reactor plant portion of the present invention and a process diagram of the emergency electrical portion of the present invention.

Referring to FIGS. 1 and 1A, the Reactor Plant I includes a nuclear reactor 1, multistage compressors 4 and 5, multistage turbine 2, interconnecting shafting or spooling A, B, C and K, interconnecting ducting 000 through 011, and heat exchangers 33, 34, 65 and 66. The components include a closed-system gas circulation, regenerative Brayton cycle containing a gas cooled nuclear reactor 1. The reactor is somewhat similar to a gas turbine-modular helium reactor (GT-MHR) in that the reactor core is graphite and cooled by helium. However, the reactor 1 may be about two-thirds the size of a typical GT-MHR. Additionally, the turbines 2 as well as compressors 4 and 5 of the reactor plant do not operate at a constant speed as is required if the turbines rotate an electrical generator. The compressors 4 and 5 and heat exchangers 33, 34, 65 and 66 are located within a compact steel vessel for protective purposes. The turbine 2 and compressors 4 and 5 are oriented horizontally instead of the GT-MHR vertically orientation to properly mate with the air compressors and main electrical generator. The reactor 1 is preferably located underground and the reactor plant components are also located in a steel and concrete containment building for further protection.

The reactor 1 heats a pressurized gaseous cooling medium, such as helium, serving as the working fluid that is routed through ducting 000 and expanded through multi-stage turbine 2. Multi-stage turbine 2 is mounted to shafts or spooling B and C that drive compressors 4 and 5. The turbine 2 is also mounted to a shaft or spooling A and B that drive compressors 11 and 12. Compressors 11 and 12 pressurize the open-system working fluid of the Compressor Plant II. The closed-system working fluid is expanded through the multi-stage turbine 2 that directs the fluid through ducting 001 to a regenerative heat exchanger or recuperator 3. The regenerative heat exchanger 3 transfers energy to the closed-system working fluid prior to re-entry to the reactor 1.

The cooled closed-system working fluid is discharged from the regenerative heat exchanger 3 through ducting 002 and directed to a heat exchanger 33 to transfer energy to the liquid fluid of the Vapor Addition Unit III by ducting 307, 308, heat exchanger 36 and ducting 309. The closed-system working fluid is then directed through ducting 003 to intercooler heat exchanger 65. Intercooler heat exchanger 65 removes energy from the closed-system working fluid to a heat sink prior to entry of the closed-system working through ducting 004 into a low pressure compressor 4.

Low pressure compressor 4 then directs the pressurized closed-system working fluid through ducting 005 to another heat exchanger 34. Heat exchanger 34 transfers energy to the liquid fluid directed to the Vapor Addition Unit III by ducting 311, heat exchanger 37 and ducting 312. The closed-system working fluid is then directed through ducting 006 to a heat exchanger intercooler 66 to remove energy to a heat sink prior to entry of the closed-system working fluid through ducting 007 to the high-pressure compressor 5. High-pressure compressor 5 fully pressurizes the closed-system working fluid prior to entry through ducting 008 to the regenerative heat exchanger 3 that pre-heats the closed-system working fluid prior to re-entry through ducting 009 to the reactor 1. The helium working fluid is cooled between the high 5 and low 4 pressure compressors. A portion of the energy is used to heat water destined for the Vapor Addition Unit III designed to add moisture to the compressed air of the open-system working fluid.

The thermodynamic characteristics of an illustrative example of the regenerative, Brayton closed-system are summarized in the table below.

| | Typical Thermodynamic Characteristics - Reactor Plant I | | | | | | |
|---|---|---|---|---|---|---|---|
| | | | Pressure | Temperature | | | |
| | Power mW | (inlet) Psia | in ° F. | out | Flow lbm/sec | Working Fluid | Pressure Ratio |
| Reactor 1 (gross) | 429 | 1030 | 960 | 1565 | 540 | Helium | |
| Turbine 2 | 389 | 1015 | 1560 | 1015 | 540 | Helium | 2.4 |
| LP Compressor 4 | (85) | 415 | 65 | 190 | 540 | Helium | 1.6 |
| HP Compressor 5 | (85) | 650 | 65 | 190 | 540 | Helium | 1.6 |
| Output subtotal | 215 | | | | | | |

The above summary characteristics are provided for illustrative purposes only and are based on the published capabilities of a Modular Helium Reactor. As will be observed as part of the detailed discussion of the Compressor Plant II, the Reactor Plant I's power output matches the power requirements of the open-system Brayton cycle portion of the system.

Routine control of the Reactor Plant I compressors 4 and 5 (as well as compressors 11, 12, and 13 of the Compressor Plant II) is achieved by altering the density of the closed-system working fluid, which alters the mass flow and pressure. More specifically, an accumulator/receiver vessel 6, ducting 010 and 011, as well as control valves 6A and 6B, are provided between the discharge ducting 008 of the high-pressure compressor 5 and the discharge ducting 002 from the regenerator 3.

As can be observed in the preceding example, a pressure differential of approximately 600 psia exists between the ducting 002 and 008. The speed of the compressors is reduced by opening control valve 6A while control valve 6B is closed, thereby removing working fluid from the primary circuit. This also reduces the pressure of the system. The process is reversed to increase the speed of the compressors by reintroducing the higher pressure working fluid stored within the accumulator/receiver vessel 6 into ducting 008.

The reactor's 1 control rods are moved as necessary to maintain stable reactor outlet temperatures, thereby maintaining steady thermal conditions within the reactor 1. The accumulator/receiver vessel 6 and control components are sized to ensure compressors 4 and 5 operate within their optimum operational limitations.

Figure 1B:
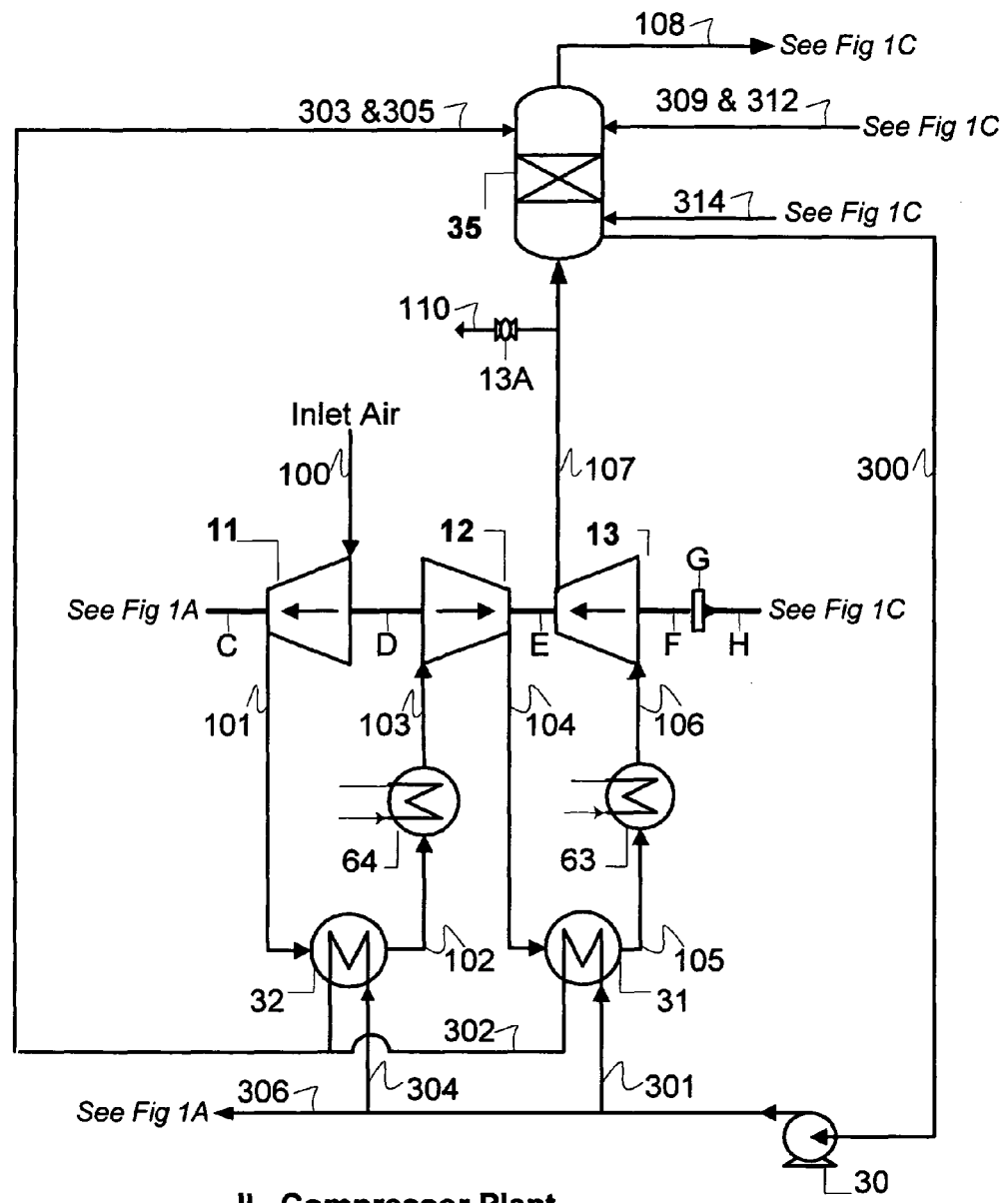
FIG. 1B is a process diagram of the compressor plant portion of the present invention.

Referring to FIGS. 1 and 1B, the Compressor Plant II includes compressors 11, 12, and 13 driven by the turbines 2 of the Reactor Plant I, interconnecting shafting or spooling C, D, E, F, and clutch G, interconnecting ducting 100 through 109 and heat exchangers 31, 32, 63, and 64. These components include part of an open-system Brayton cycle with the ambient working fluid directed by ducting 100 into the low-pressure compressor 11. Low-pressure compressor 11 partially pressurizes the open-system working fluid that is then directed by ducting 101 to a heat exchanger 32. Heat exchanger 32 transfers energy to the working liquid fluid of the Vapor Addition Unit III.

Conventional gas turbine compressors are used to pressurize the open system working fluid (air). Low-pressure, intermediate-pressure and high-pressure air compressors, which are rotated by the helium gas turbines of the reactor plant, are used to sequentially increase the pressure of the air ultimately directed into the gas turbine. In order to increase the efficiency of the power plant, the air temperature is reduced between the compressors. In addition, some low-grade energy is used to heat water subsequently vaporized into the air stream.

The open-system working fluid is then directed by ducting 102 to an intercooler heat exchanger 64 to remove energy to the heat sink prior to entry of the open-system working fluid through ducting 103 into an intermediate-pressure compressor 12. Intermediate-pressure compressor 12 partially pressurizes the open-system working fluid. The open-system working fluid is then directed by ducting 104 to heat exchanger 31 which transfers energy to the liquid fluid of the Vapor Addition Unit III.

The open-system working fluid is then directed by ducting 105 to intercooler heat exchanger 63 to remove energy to the heat sink prior to entry of the open-system working fluid through ducting 106 into the high-pressure compressor 13. The high-pressure compressor 13 fully pressurizes the open-system working fluid that is then directed by ducting 107 to the saturator vessel 35 of the Vapor Addition Unit III. The open-system working fluid is directed by ducting 108 to the heat exchangers 15 of the Heat Recovery Unit IV where the moisture laden working fluid is heated by the exhaust from the gas turbine 17 prior to entry into the Turbine Plant V through ducting 109.

An illustrative example of the thermodynamic characteristics of the Compressor Plant II are summarized below Thermodynamic Characteristics - Compressor Plant II

|  | Power mW | Pressure (inlet) Psia | Temperature In °F. | Temperature out °F. | Flow Lbm/sec | Working Fluid | Pressure Ratio |
|---|---|---|---|---|---|---|---|
| LP Compressor 11 | (102) | 14.7 | 55 | 350 | 1205 | Air | 4.9 |
| IP Compressor 12 | (106) | 62 | 70 | 378 | 1195 | Air | 4.9 |
| HP Compressor 13 | (7) | 288 | 70 | 92 | 1190 | Air | 1.14 |
| subtotal | (215) | | | | | | |

The Compressor Plant's II low-pressure compressor 11 and intermediate-pressure compressor 12 may be multistage axial-flow compressors, while the high-pressure compressor 13 may be a centrifugal-flow compressor as the latter type of compressor is less adversely affected by pressure surges that can occur during transients associated with the relatively long ducting lengths to the gas turbine 17. The high-pressure compressor 13 is also sized (by virtue of a low pressure ratio) in to achieve relatively low temperatures of the open-system working fluid entering the vapor addition unit III, thereby reducing thermodynamic irreversibilities associated with the moisture addition process.

Figure 2:
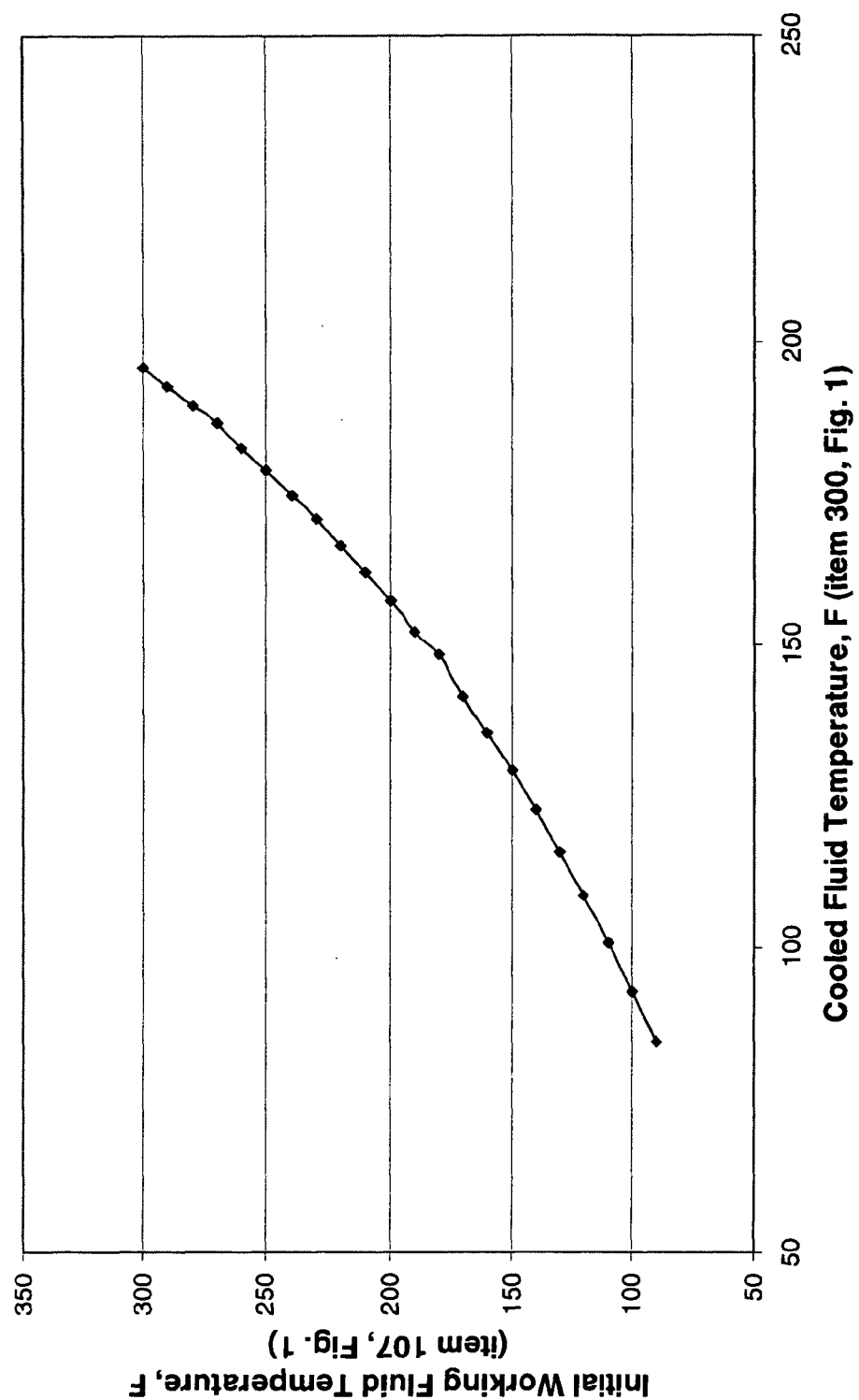
FIG. 2 is a graph of the effect of air evaporative cooling.

In particular, referring to FIGS. 1, 1B and 2, as the temperature of the entering open-system working fluid in ducting 107 increases, the evaporative process causes liquid fluid exiting through ducting 300 to also increase. However, the higher exit liquid temperature reduces the quantity of low grade energy that can be removed from the working fluids by heat exchangers 31, 32, 33 and 34. As such, optimization of the overall thermal cycle lies more with achieving relatively lower temperatures of the open-system working fluid entering the Vapor Addition Unit III through ducting 107.

Referring to FIGS. 1, 1A and 1B, control of the Compressor Plant II is achieved within the Reactor Plant I by varying the density (and mass flow) of the closed-system working fluid. This provides for the varying the speed of compressors 11, 12, and 13, thus altering the mass flow of the open-system working fluid. Additional control measures include not normally directly coupling compressor 11, 12, and 13 to the turbine 17 or electric generator 50 during power operations. In the event of loss of the gas turbine 17 or electrical generator 50, open-system working fluid is discharged to ambient through ducting 110 and 111 as well as control valves 13A and 13B, with the Reactor Plant I and Compressor Plant II operations reduced as appropriate. This feature allows continued operation of the Reactor Plant I during severe plant transients, thereby minimizing thermally induced stress on the reactor 1.

A clutch G is provided between shaft F of the Compressor Plant II and shaft H of the Turbine Plant V. The clutch G is employed during startup of the Reactor Plant I and Turbine Plant VI to support sequential rotation of turbines 2 and 17 using generator 50 as a motor. Additionally, this same arrangement provides for emergency cooling of the reactor 1, with reactor decay heat removed through the heat exchangers 33 and 34 to the heat sink or through heat exchangers 65 and 66 (bypassing heat exchangers 36 and 37) to ambient by way of saturator vessel 35 and ducting 108 and 111, using control valve 13B. The clutch G is positioned between air compressors and main electrical generator. The clutch G is not normally engaged during power operations.

As shown on FIG. 1A, a diesel engine 52, clutch L and geared speed reducer N coupled to shafts K, M O and P can be used to support reactor emergency cooling by rotating the compressors 4 and 5, with heat removed through the intercoolers 65 and 66 or through heat exchangers 33 and 34 and then (referring to FIG. 1B) to the atmosphere through saturator 35. The diesel engine 52 could thus serve as a backup to the electrical generator 53 (acting in a motor mode) that would be normally used to support removal of the reactor's shutdown decay heat. The diesel engine 52 and clutch L would be typically located outside the containment or confinement building 80 to allow ready access to the engine.

As depicted on FIGS. 1, 1A and 1B, the Vapor Addition Unit III includes a saturator vessel 35, heat exchangers 31, 32, 33, and 34 as well as ducting 300-314 and pumps 30 and 38. These components direct and heat a fluid that is combined with the working fluid of the open-system Brayton cycle, thereby integrating a Rankine cycle with the open-system Brayton cycle. In particular, open-system working fluid is discharged through ducting 107 from high-pressure compressor 13 into the lower portion of saturator vessel 35. Hot fluid heated by heat exchangers 31, 32, 33, 34, 36 and 37 is contacted counter-currently and evaporated in multiple stages in saturator vessel 35 to add moisture and heat to the open-system working fluid.

Liquid fluid not vaporized in the saturator vessel 35 is discharged by ducting 300 to saturator pump 30. Saturator pump 30 directs the fluid to the Compressor Plant II as well as Reactor Plant I and Heat Recovery Unit IV. Make-up fluid obtained from the Water Recovery Unit VI located within the Heat Recovery Unit IV is directed through ducting 313, pump 38 and ducting 314 into the bottom of the saturator vessel 35.

The fluid vaporization energy obtained from the Compressor Plant II is transferred by directing fluid from saturator pump 30 through ducting 301 to heat exchanger 31 and then to the saturator vessel 35 through ducting 302 and 303. Fluid is also directed by pump 30 through ducting 304 to heat exchanger 32 and then to saturator vessel 35 through ducting 305.

Heated fluid from the Reactor Plant I and Heat Recovery Unit IV is obtained by directing fluid from saturator pump 30 to ducting 306 to heat exchanger 33. The fluid is then directed through ducting 308 to heat exchanger 36 located in Heat Recovery Unit IV. The fluid is then directed to the saturator vessel 35 through ducting 309. The fluid is also directed from pump 30 through ducting 306 and 310 to heat exchanger 34 and then through ducting 311 to heat exchanger 37 located in Heat Recovery Unit IV and then to the saturator vessel 35 through ducting 312. This process involves separately injecting the heated fluids into the saturator vessel 35, at appropriately staggered elevations, in order to minimize thermodynamic irreversibilities (mixing, cooling then ultimately re-heating the fluids). However, the hot fluids directed to the saturator vessel 35 could be combined and injected at one point.

The Vapor Addition Unit III reclaims low-grade heat that is not ordinarily recoverable through more conventional means, thereby increasing the capabilities of the overall process. The low grade heat is obtained from the general heat exchanger cooler process used to reduce the energy requirements of the compressors and from the Heat Recovery Unit IV energy not otherwise used by the open-system Brayton and Rankine cycles. In general, inter-cooling of the compressors does not typically increase the efficiency of a combined cycle process. However, the humidification process is able to partially overcome this shortfall by utilizing a portion of the pre-cooler, intercooler and after-cooler low grade energy, thus allowing for a reduction in the mass flow of the open-system working fluid pressurized by compressors 11, 12, and 13, thereby reducing the energy required for compression.

The proportion of low-grade energy used to support the humidification process varies depending on the specifics of the design, an example of which is summarized below.

| Low Grade Heat Sources - Vapor Addition Unit III | |
| --- | --- |
| Reactor Plant I | ~25% |
| Compressor Plant II | ~50% |
| Heat Recovery Unit IV | ~25% |
| Net | 100% |

Relative to the heat sources that supply energy to the Vapor Addition Unit III, the contribution is further apportioned as illustratively summarized below.

| Low Grade Heat Sources - Reactor Plant I (~25% of total) | |
| --- | --- |
| LP compressor 4 pre-cooling | ~60% |
| heat sink, 66 | ~45% |
| vapor addition, 34 | ~55% |
| HP Compressor 5 Inter-cooling | ~40% |
| heat sink, 65 | ~60% |
| vapor addition, 35 | ~40% |

| Low Grade Heat Sources - Compressor Plant II (~50% of total) | |
| --- | --- |
| IP compressor 12 inter-cooling | ~48% |
| heat sink, 64 | ~15% |
| vapor addition, 32 | ~85% |
| HP compressor 13 after-cooling | ~52% |
| heat sink, 63 | ~15% |
| vapor addition, 31 | ~85% |

The humidification process of the illustrated example adds approximately 12% by weight of moisture to the open-system working fluid ultimately directed to gas turbine 17.

Control of the Vapor Addition Unit III is achieved by altering and optimizing the flow of the fluid through all of the heat exchangers 31, 32, 33, 34, 36, and 37. In general, the total mass flow of the liquid fluid establishes the level of moisture that can be added to the open-system working fluid, with the control strategy based on maximizing the energy extracted from the various heat sources while matching the temperature of the liquid fluid exiting the saturator vessel 35 to the temperature associated with the initial evaporation of the working fluid entering the saturator vessel 35. Additionally, the ability to alter the liquid fluid mass flow to the saturator vessel 35 allows for reducing the mass flow of the working fluid directed through the gas turbine 17, thereby providing another means to meet load reduction requirements that may be imposed by the electrical grid. Such reductions, however, will reduce the overall efficiency of the facility as more energy will be lost to the heat sink and/or ambient air.

Figure 1C:
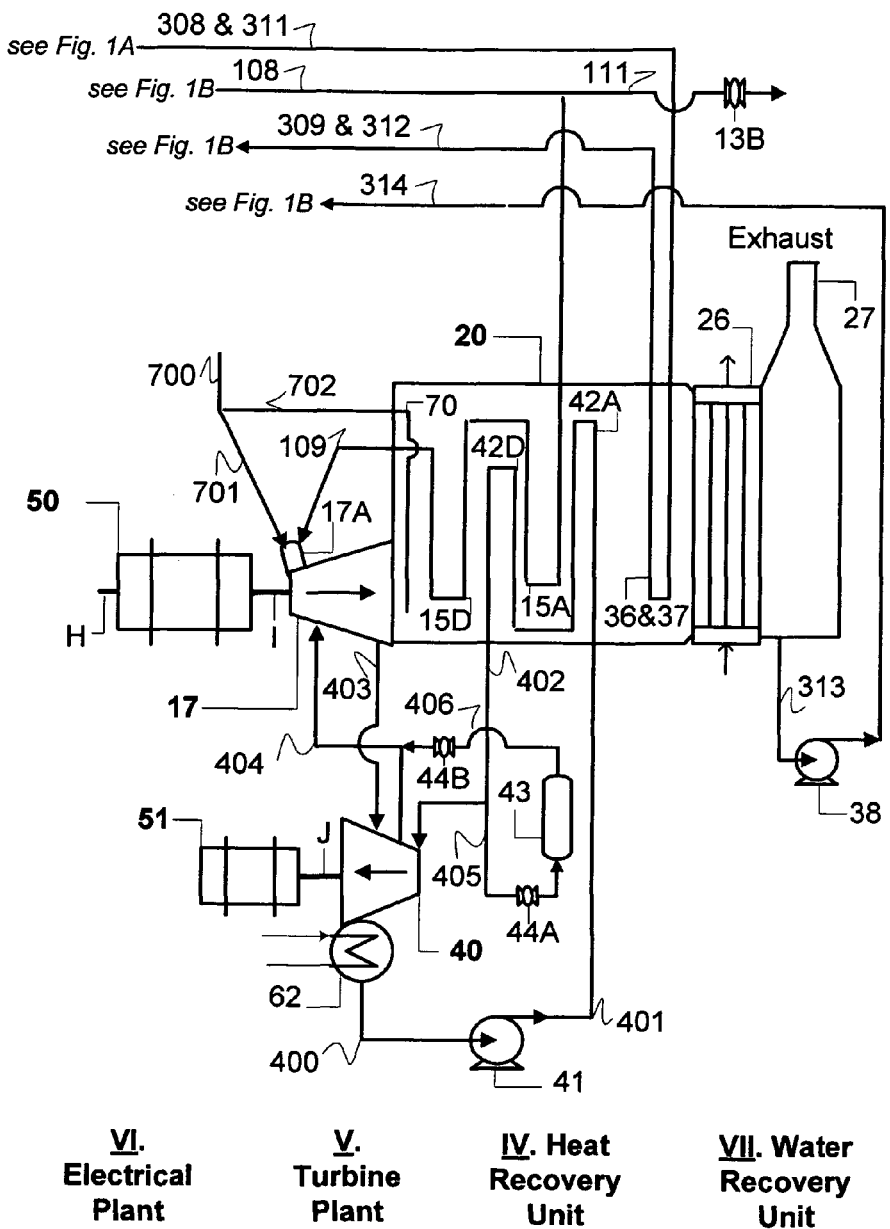
FIG. 1C is a process diagram of the turbine and electrical plants portion of the present invention as well as process diagram of the heat and water recovery portions of the present invention.

As depicted by FIGS. 1 and 1C, the Heat Recovery Unit IV includes a structure and insulated casing 20 that house groups of heat exchangers 15, 42, 36, 37, and 26 that recover the energy and moisture associated with the open-system working fluid exhausted from the gas turbine 17 of the Turbine Plant V, as well as housing duct burners 70 and supply ducting 702 used to fire fuel that adds additional energy to the gas turbine 17 exhaust gas. Because the open-system working fluid pressure of the regenerative heat exchangers 15 is relatively low (approximately 300 psia, for the illustrative example), duct firing temperatures may be significantly higher than those associated with conventional heat recovery steam generators (with heat exchanger internal steam pressures approaching 2000 psia) without exceeding acceptable material stress levels.

The duct burner 70 allows for higher plant electrical outputs than otherwise achieved, with the additional energy distributed to all the underlying sub-cycles present within the Heat Recovery Unit IV, namely the integrated Brayton/Rankine cycle created by the Vapor Addition Unit III and gas turbine 17, as well as the Rankine steam cycle created by heat exchangers 42 and steam turbine 40. In addition, depending on the emission levels obtained by firing the moisture-laden, open-system working fluid in the combustor 17A of the gas turbine 17, a selective catalytic regenerative system employing catalyst and ammonia vapor injection equipment may be housed in the Heat Recovery Unit IV to further reduce Nitrogen Oxide emissions. This equipment has not been shown in FIGS. 1 and 1C for drawing simplification purposes.

The proportion of energy utilized within the Heat Recovery Unit IV varies depending on the specifics of the design. The majority of the energy associated with the Heat Recovery Unit IV is employed with the regenerative process of the open-system, Brayton cycle. The example provided below is a general illustrative summary of the energy use within the Heat Recovery Unit IV.

| Energy Utilization Summary - Heat Recovery Unit IV | |
| --- | --- |
| Regenerative heat exchangers 15A-15D | ~79% |
| Rankine steam cycle heat exchangers 42A-42D | ~6% |
| Vapor addition unit III heat exchangers 36 and 37 | ~15% |
| Net | 100% |

The actual number, size and location of the heat exchangers and duct burners located within the Heat Recovery Unit IV may vary as optimized for specific process objectives. Those skilled in the art will recognize that additional duct burners may be placed within the Heat Recovery Unit IV at several locations to generate additional steam if so required by specific process needs.

As depicted by FIGS. 1 and 1C, the Turbine Plant V includes a multi-stage gas turbine 17 of the open-system Brayton cycle and a steam turbine 40 of the Rankine steam cycle, with cooling steam supplied to the gas turbine 17 from the steam turbine 40. The thermodynamic characteristics of the Turbine Plant V are summarized below for an illustrative example.

| Summary Output Characteristics - Turbine Plant V | | | |
| --- | --- | --- | --- |
| | Gross Output, mW | Inlet Pressure, psia | Working fluid |
| Gas turbine 17 | 750 | 305 | Air/vapor |
| Steam turbine 40 | 20 | 2250 | Vapor |
| Output subtotal | 770 | | |
| Gas turbine 17 fuel energy | 760 | — | natural gas |

The gas turbine 17 portion of the Turbine Plant IV may include ducting 109 that directs moisture-laden, open-system working fluid from the Heat Recovery Unit III into the gas turbine's combustor 17A. Fuel supplied by ducting 701 is mixed and ignited in the gas turbine's combustor 17A prior to being directed into the rotating turbine blades. The turbine 17 drives the shafting I connected to electrical generator 50. The multi-stage gas turbine 17 may be of an advanced design (such as the steam cooled General Electric "H" series or Mitsubishi "G" gas turbine), wherein steam is used to help cool the internal components of the turbine exposed to high temperatures. Because of the moderate presence of water vapor, the open-system working fluid possesses much better heat removal capabilities than air. As a result, the gas turbine 17 of the Hybrid Integrated Nuclear Turbine system may require less steam cooling than current advanced designs while possessing the capability to more readily achieve higher firing temperatures, with accompanying higher plant efficiencies.

Additionally, the combustor 17A may be of a "can" or diffuser design with the working fluid flowing straight through, unlike those of traditional heavy frame gas turbines where the working fluid must make several nearly 180 degree turns when exiting from the compressor to the combustor. Accordingly, pressure losses may be much lower with the straight through design. In addition, the firing of moisture-laden air by a gas turbine inherently achieves lower pollution levels, such as Nitrogen Oxide, than conventional gas turbines firing dry air. Thus, less complex pollution control equipment may be used to meet environmental regulations. The weight ratio of water vapor to fuel is approximately 5:1. As such, Nitrogen Oxide emission levels in the vicinity of single digits, on a parts-per-million basis, may be expected without the use of selective catalytic removal systems. Such equipment would, however, likely allow for reaching exceptionally low emission levels.

The steam turbine cycle of the Turbine Plant IV may include a small steam turbine 40 provided primarily to efficiently supply cooling steam to the gas turbine 17. The small size of the steam turbine is the result of most of the energy associated with the gas turbine's 17 exhaust being used for heating the open-system's moisture-laden working fluid, as opposed to heating the working fluid of a Rankine steam cycle, as is the case for a combined cycle power plant. The Rankine steam cycle of the Turbine Plant IV includes a condenser 62 where steam exhausted from turbine 40 is cooled and then condensed into liquid water using water cooled by the heat sink.

The condensed liquid is directed by ducting 400 to pump 41 that pressurize the fluid that is then directed by ducting 401 to the Heat Recovery Unit IV. Within the Heat Recovery Unit IV, heat exchangers 42A through 42D heat, vaporize and then superheat the high pressure fluid that is directed by ducting 402 to the steam turbine 40 wherein intermediate pressure steam is extracted and directed by ducting 403 to gas turbine 17 to provide cooling. Lower pressure, re-heated steam is directed from gas turbine 17 by ducting 404 back to steam turbine 40 where the energy of the steam is used to further increase the output of electrical generator 52 driven by steam turbine 40 through shafting J. Low pressure (vacuum) vapor exhausted from steam turbine 40 is directed back into condenser 62.

The condensed liquid is directed by ducting 400 to pump 41 that pressurize the fluid that is then directed by ducting 401 to the Heat Recovery. Unit IV. Within the Heat Recovery Unit IV, heat exchangers 42A through 42D heat, vaporize and then superheat the high pressure fluid that is directed by ducting 402 to the steam turbine 40 wherein intermediate pressure steam is extracted and directed by ducting 403 to gas turbine 17 to provide cooling. Lower pressure, re-heated steam is directed from gas turbine 17 by ducting 404 back to steam turbine 40 where the energy of the steam is used to further increase the output of electrical generator 51 driven by steam turbine 40 through shafting J. Low pressure (vacuum) vapor exhausted from steam turbine 40 is directed back into condenser 62.

Those skilled in the art will recognize that this invention also encompasses designs wherein the gas turbine 17 cooling steam is not directed back to the steam turbine 40, but is rather directly used by the gas turbine 17, then exhausted into the Heat Recovery Unit IV with the open-system working fluid.

As depicted by FIGS. 1 and 1C, the Electric Plant VI includes electrical generators 50 and 51 connected by shafting I and J to turbines 17 and 40. Electrical generator 50 is connected by. shafting I to gas turbine 17 and by shafting H to clutch G. During power generation, the clutch G is not normally engaged. However, during initial start-up of the power plant, clutch G is engaged to shaft F in order to rotate the turbines and compressors of the Reactor Plant I and Compressor Plant II. Electrical generator 51 is connected by shafting J to steam turbine 40.

As depicted by FIG. 1A, also part of the Electric Plant VI are the emergency diesel 52 connected by shafting P to emergency generator 53 that can supply power to the facility in the event of the loss of off-site power.

The generator characteristics of the Electric Plant VI are summarized below as an example.

| Summary Characteristics - Electrical Plant VI | |
|---|---|
| | Output, mW |
| Gas turbine generator | 746 |
| Steam turbine generator | 19 |
| Generators gross output | 765 |

As depicted by FIGS. 1 and 1C, the Water Recovery Unit VII is housed within the casing structure 20 of the Heat Recovery Unit IV and is provided to re-capture moisture added to the open-system working fluid by the Vapor Addition Unit III and by combustion of the fuel fired by the gas turbine 17 and duct burners 70. Water cooled by the heat sinks may be used to condense the moisture contained within the exhaust from the gas turbine 17, with the cooling water circulated by a heat exchanger 26 located the Heat Recovery Unit IV as well as potentially sprayed directly into the exhaust.

The condensed moisture is typically acidic due to absorption of carbon dioxide that is present within the open-system working fluid discharged from the gas turbine 17. However, a neutralizing vapor (such as ammonia used with a selective catalytic reduction system) can be injected into the Heat Recovery Unit IV to reduce the acidity of the condensate. Equipment to further treat the condensate, as well as makeup water, would also be typically required but has not been shown for drawing simplification purposes. Those skilled in the art will recognize that the present invention also includes use of a heat exchanger (not shown for simplification purposes) to transfer energy from the water condensed in the Water Recovery Unit VII to pre-heat the fuel gas directed to combustor 17A.

The Water Recovery Unit VII is one of the larger heat sink loads which are summarized below for an illustrative example.

| Heat Sink Energy Distribution | |
|---|---|
| Helium pre-cooler 65 | 10% |
| Helium inter-cooler 66 | 6% |
| Air after-cooler 31 | 16% |
| Air inter-cooler 32 | 11% |
| Water recovery 26 | 38% |
| Condenser 62 | 3% |
| Stack 27 | 16% |
| Net | 100% |

Those skilled in the art will observe that the invention also encompasses the use of refrigeration cooling processes with the intercooler heat sink cooling methods, thereby helping maintain power plant output during conditions of high ambient temperatures.

The use of the Vapor Addition Unit III allows a Rankine steam cycle to be directly integrated into the open-system gas turbine cycle. However, the vapor addition process using intercooler waste heat also reduces the temperature of the working fluid discharged from the compressors. Ordinarily, such a condition would require the use of more fuel to achieve the firing temperature of the gas turbine 17. Additionally, the moisture added to the open-system working fluid also requires the use of more fuel relative to simply firing air and fuel mixture in the combustor 17A of the gas turbine 17. However, these detrimental effects on the overall cycle efficiency are overcome by the following:

(a) Reducing the energy required for compression of the open-system working fluid by adding moisture into the working fluid downstream of the compressors by way of the evaporative process occurring in the moisture addition vessel. The pressurizing of the liquid used with evaporative process requires significantly less energy than compression of the open-cycle working fluid.

(b) Use of highly efficient, gas cooled, nuclear reactor-based, closed-system gas turbines to provide the energy to drive the compressors of the open-system, regenerative, Brayton cycle. The closed-system working fluid is typically Helium which has a more favorable "k" (ratio of heat capacity at constant pressure to heat capacity at constant volume) than air, thus providing for more efficient compression of the open-system working fluid than could be achieved if the turbine employed air as a working fluid.

(c) Use of a very high temperature (approaching or exceeding 2600 F) Rankine steam cycle integrated with the Brayton gas turbine open-system. Although the integrated Rankine cycle discharge pressure is at atmospheric conditions (vice at a vacuum as is the case with a conventional Rankine cycle), the net energy associated with the integrated Rankine cycle tends to exceed the energy that could be obtained if a conventional steam cycle were used. The later conventional Rankine steam cycle is typically limited to a temperature of approximately 1060 degrees F. and pressure of approximately 2000 psia due to material limitations.

(d) Use of higher gas turbine mass flows than ordinarily achieved at standard temperatures (59 F) if only air and fuel were fired in the gas turbine. The higher mass flow is as a result of the vapor addition process, with the net mass flow though turbine approximately that of the maximum design flow through the turbine (this typically occurs at a temperature of 10 F). The mass flow through the gas turbine is thus held relatively constant by the processes of this invention.

(e) Use of duct firing in the Heat Recovery Unit III to achieve very high temperatures for the regenerative portion of the open-system Brayton cycle.

(f) Use of multiple working fluids within the Heat Recovery Unit III to maximize heat utilization.

The net result of the above is that the process of the present invention is expected to approach or exceed thermal cycle efficiencies of 63 percent.

Figure 1D:
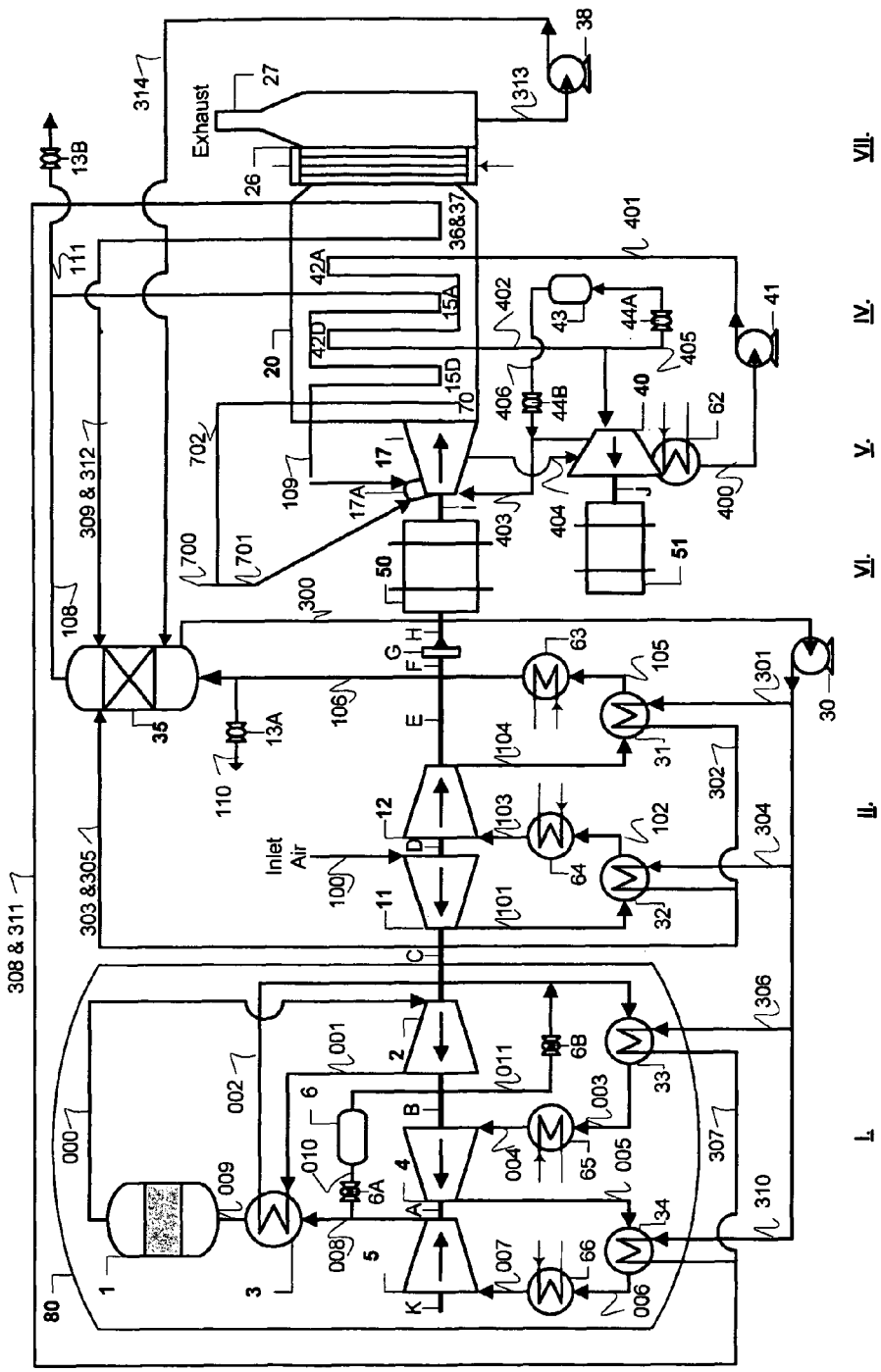
FIG. 1D is an overall process diagram of an additional version of the present invention.

As depicted by FIG. 1D, a variation on the present invention would involve removal of the high-pressure compressor 13 of FIG. 1 while using the low-pressure compressor 11 and intermediate-pressure compressor 12 designed to pressurize the open system working fluid to the required levels. All other components would remain as depicted in FIG. 1. This simplified design would yield a more efficient and cost effective power plant, provided the compressor designs can accommodate open-system working fluid transient (surge) conditions.

Figure 1E:
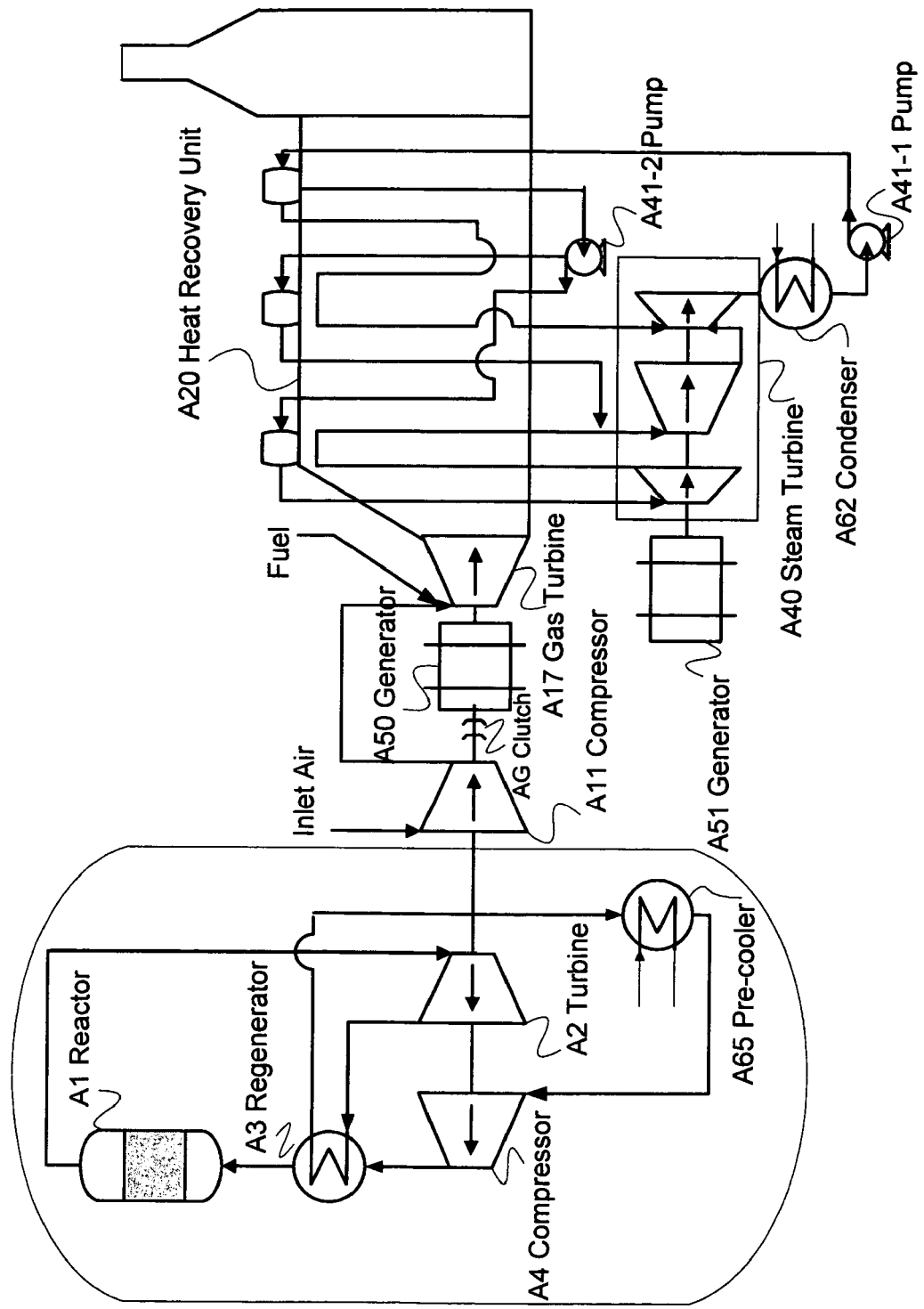
FIG. 1E is an overall process diagram of a simple version of the present invention.

As depicted by FIG. 1E, a simplified version of the present invention would not utilize the Vapor Addition Plant III and open-system regenerative process. Instead, the energy from gas turbine exhaust would be used with a Rankine thermal cycle aligned in series with the open system Brayton cycle, similar in part to prior art combined cycle power plant designs. However, the Reactor Plant turbine A2 would rotate the closed system's single compressor A4 and Compressor Plant's single compressor A11. A pre-cooler A65 would reduce the temperature of the closed system working fluid prior to being directed to compressor A4. Gas turbine A17 would rotate generator A50, with clutch AG used for plant start-up. The Heat Recovery Unit A20 is a 3 pressure configuration with steam turbine A40, consisting of a high-pressure (HP), re-heat (RH) and low-pressure (LP) sections rotating generator A51. Pumps A41-1 and A41-2 would pump water from condenser A62 to Heat Recovery Unit A20. This design would be a simplified variant of the present invention. The simplest version of the present invention would omit the steam production (Heat Recovery Unit and steam turbine) portion of the plant and simply direct the open-system working fluid exhausted from the gas turbine A17 to the atmosphere.

The advantages of the present invention become clearer when contrasted against similar and existing technologies. More specifically, comparison are made between: the preferred embodiment of the present invention as depicted by FIG. 1; the simplified variant of the present invention, as depicted by FIG. 1E; and a conventional combined cycle power plant, as depicted by FIG. 3 and consisting of air compressor, gas turbine, electrical generator, heat recovery steam generator and steam turbine.

Figure 3:
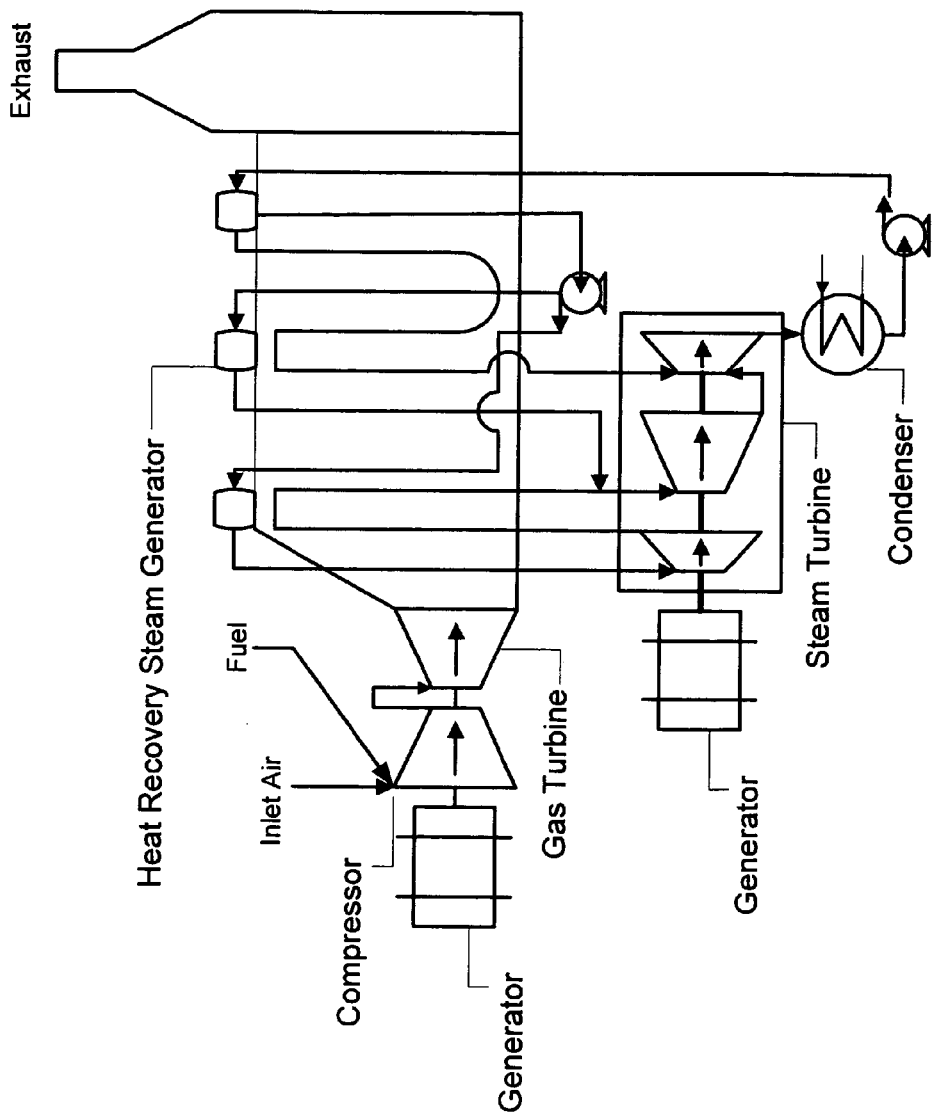
FIG. 3 is an overall process diagram of prior art typical combined cycle power plant.

| Performance and Cost Summary Comparison | | | |
|---|---|---|---|
| Process Summary | Combined Cycle, 2 × 1 Plant FIG. 4 | Simple Hybrid Integrated Nuclear Turbine Plant FIG. 3 | Hybrid Integrated Nuclear Turbine Plant FIG. 1 |
| Net Output, mW | 760 | 660 | 750 |
| Gas turbine(s) | 528 | 549 | 746 |
| Steam turbine | 245 | 127 | 19 |
| Auxiliary load | (23) | (16) | (15) |
| Reactor Output, mW | n/a | 697 | 429 |
| Plant Heat Rate, BTU/kWh (LHV) | 6050 | 6450 | 5390 |
| Net Plant Efficiency (LHV) | 56% | 53% | 63% |
| Net Generation, × 10^6 mWh | 6.5 | 5.5 | 6.4 |
| Fuel Gas Usage, mmBTU/year × 10^6 | 40 | 20 | 22 |
| Fissile Fuel Usage, mmBTU/year × 10^6 | n/a | 20 | 12 |
| Fuel Gas Cost, $(US) × 10^6/year | 261 | 131 | 145 |
| Reactor Fuel Cost, $(US) × 10^6/year | n/a | 41 | 25 |
| Net Fuel Cost, $(US) × 10^6/year | 261 | 172 | 170 |
| Variable Fuel Cost, $/mWh/year | 41 | 30 | 27 |
| Notes | 1, 4, 7 | 2, 4, 5, 6, 7 | 2, 3, 4, 5, 6, 7 |

Notes:
1. 2 × 1 501 G configuration, 2 gas turbines × 1 steam turbine, Mitsubishi Heavy Industries, per "Gas Turbine World - 2005 GTW Handbook"
2. 1 × 1 configuration, 1 gas turbine × 1 steam turbine based on 501 G gas turbine.
3. Supplemental duct firing operation in heat recovery unit
4. Fuel gas cost $6.00/mmBTU (HHV)
5. Turbine electrical output at generator terminals.
6. Fissile fuel cost estimated at $2.00/mmBTU
7. Auxiliary load includes cooling tower and transformer losses.

As shown, the Hybrid Integrated Nuclear Turbine system power plant possesses a major competitive advantage with respect to fuel costs. This is offset somewhat by the higher capital cost (and corresponding yearly debt repayments) of the Hybrid Integrated Nuclear Turbine system.

Another comparison involves emissions which are summarized for the illustrative example of the present invention relative to conventional power plants.

| Power Plant Emissions Summary Comparison (Normalized to traditional pulverized coal plant) | | | | |
|---|---|---|---|---|
| Typical Emissions[1] | Traditional Pulverized Coal[2] | Advanced Coal[3] | Gas Combined Cycle[4] | Hybrid Integrated Nuclear Turbine[5] |
| Nitrogen Oxides | 100% | ~49% | ~6% | ~4% |
| Sulfur Oxides | 100% | ~14% | ~0.1% | ~0.06% |
| Carbon Monoxide[6] | 100% | ~18% | ~1.5% | ~0.9% |

-continued

Power Plant Emissions Summary Comparison (Normalized to traditional pulverized coal plant)

| Typical Emissions[1] | Traditional Pulverized Coal[2] | Advanced Coal[3] | Gas Combined Cycle[4] | Hybrid Integrated Nuclear Turbine[5] |
|---|---|---|---|---|
| Carbon Dioxide[6] | 100% | ~70% | ~36% | ~21% |
| Particulates | 100% | ~21% | ~5% | ~3% |
| Mercury[7] | 100% | ~20% | ~0.14% | ~0.07% |

[1]Emission values for conventional technologies obtained from various industry sources. Levels are compared on a pounds per mmBTU basis, converted to tons per year for a normalized 750 mW(e) power plant.
[2]Clean Air Act of 1970, as implemented for facilities constructed after 1978 per Part 40 Code of Federal Regulations
[3]Typical values for Circulating Fluid Bed boilers or similar advanced coal fired facility.
[4]Emission levels for typical facilities licensed in the year 2000.
[5]Excludes any gas cleaning action associated with the Water Recovery Unit VII.
[6]Emission limits not currently specifically regulated by Federal regulations for traditional coal power plants.
[7]Levels not currently specifically regulated for traditional coal power plants.

As can be observed, the Hybrid Integrated Nuclear Turbine provides for significantly lower emissions relative to traditional and advance coal technologies.

Another comparison involves water make-up requirements. A measure of the water consumption can be inferred from the energy that must be dissipated to the heat sink, with a summary comparison provided below for the illustrative example of the preferred embodiment relative to conventional power plants.

Power Plant Heat Sink Summary Comparison (Normalized to traditional nuclear power station)

| Conventional Nuclear | 100% |
|---|---|
| Pulverized Coal | ~85% |
| Combined Cycle | ~35% |
| Hybrid Integrated Nuclear Turbine | ~25% |

As shown, the Hybrid Integrated Nuclear Turbine power plant cooling and make-up water needs are small relative to more conventional technologies.

A further adaptation of the present invention lies with the use of coal gasification technology. In summary, a production facility may include a Coal Gasification Plant to supply fuel gas to the Hybrid Integrated Nuclear Turbine plant, with the later providing power as well as steam and compressed air to the gasification process. The gasification plant provides energy to the Hybrid Integrated Nuclear Turbine plant. The overall facility, designated the Nuclear Integrated Gasification Hybrid Turbine plant, employs relatively inexpensive nuclear fuel and coal while retaining the exceptionally low emissions of the hybrid integrated nuclear turbine process.

Figure 1F:
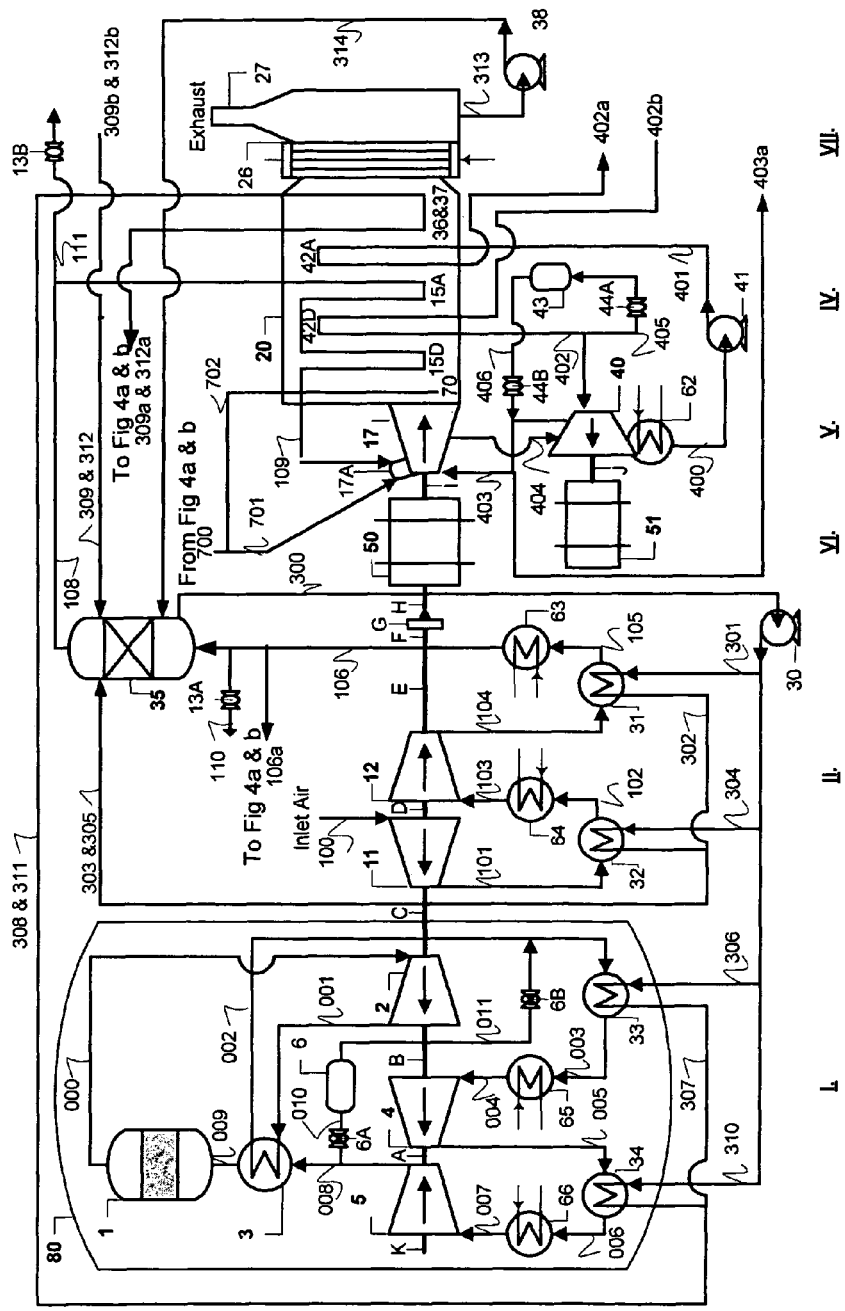
FIG. 1F is an overall process diagram of the present invention used with a coal gasification plant.
Figure 4A:
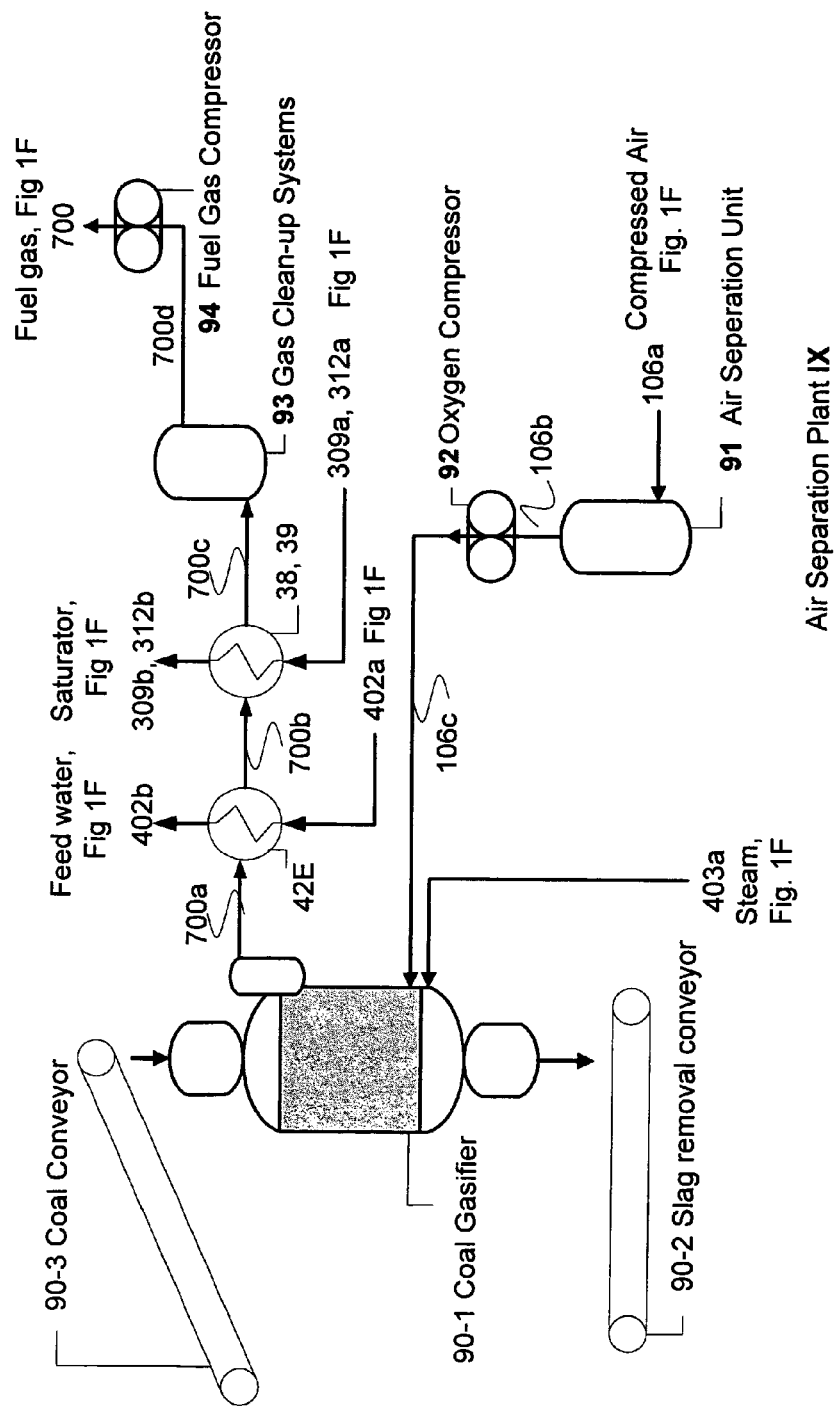
FIGS. 4A and 4B are process diagrams of coal gasification applications used with the present invention.

FIGS. 1F and 4A depict the overall process diagram for the Nuclear Integrated Gasification Hybrid Turbine plant. As illustrated by FIGS. 4A, the coal gasification plant includes an Air Separation Plant IX to provide oxygen and a Coal Gasification Plant VIII of a stationary/moving bed design. These types of gasification units require low quantities of steam and oxygen relative to other types of gasification designs. Coal is transported by a conveyor 90-3 into a coal gasification vessel 90-1 into which steam routed from the Heat Recovery Unit IV (or Steam Turbine V by way of extraction) by ducting 403a. Compressed air is routed by ducting 106a from compressor 12 to an Air separation Plant IX consisting of Air Separation Unit 91 cryogenic equipment that separates oxygen from nitrogen. Oxygen created by the air separation unit 91 is directed through ducting 106b to compressor 92 and then directed by ducting 106c to gasifier 90-1. Hot raw fuel gas is produced within gasifier 90-1 and then directed by ducting 700a, 700b and 700c through heat exchangers 38, 39 and 42E to the Gas Cleanup Systems 93 where contaminants are removed in order to create fuel gas of suitable quality for use by gas turbine 17. The fuel gas is directed to gas turbine 17 through ducting 700.

Feed water from Heat Recovery Unit IV is routed by ducting 402a to heat exchanger 42E and then directed back to Heat Recovery Unit IV by ducting 402b. Fluid used by saturator 35 is routed from Heat Recovery Unit III by ducting 309a and 312a to heat exchangers 38 and 39. The fluid is routed by ducting 309b and 312b to the saturator vessel 35. Slag is removed from the coal gasification vessel 90-1 by conveyor 90-2.

The energy removed from the raw, hot fuel gas by heat exchanger 42E helps create the additional steam needed by the gasifier 90-1. The additional steam also generates more electrical power from generator 51. The energy removed from the hot raw fuel gas by heat exchangers 38 and 39 also helps create additional mass flow through turbine 17 by evaporating, in saturator 35, more water into the open system working fluid. The additional mass flow through the turbine 17 generates more electrical output by generator 50, in turn, helping provide for the additional auxiliary power required by the Air separation Plant IX and Coal gasification Plant VII. Owing to the noteworthy presence of steam in the open cycle working fluid, gas turbine emissions may be exceptionally low without the need for complicated dry-low NOx combustors typically employed with advanced gas turbines. The nitrogen by-product of the Air Separation Plant IX may be used for assisting gas turbine cooling or as a diluent for NOx emissions control, as is the case in integrated coal gasification combined cycle plants currently being developed.

The integration of a coal gasification process and the Hybrid Integrated Nuclear Turbine may lead to dramatic reductions in fuel cost as a result of the relative low cost of coal and nuclear fuel. On a comparative basis, typical fuel cost characteristics are summarized below.

Fuel Characteristics - Integrated Coal Gasification

| Fuel | Typical Characteristics |
|---|---|
| Coal | $30.00 per ton, 10,000 BTU/lbm (LHV) or ~$1.50 per mmBTU |
| Fissile Fuel | $2.00 per mmBTU |
| Fuel Gas | 6.00 per mmBTU |

Using the above averages and the inherent capabilities of the Hybrid Integrated Nuclear Turbine, the Nuclear Integrated Gasification Hybrid Turbine production facility may be capable of achieving variable fuel costs in the vicinity of 10 $/mWh, based on a cycle efficiency exceeding 55 percent. Provided below is a further comparative summary Coal Gasification Comparisons[1]

| | Advanced Supercritical Pulverized Coal | Integrated Gasification Combined Cycle (IGCC)[2] | Nuclear Integrated Gasification Hybrid Turbine | Hybrid Integrated Nuclear Turbine[3] |
|---|---|---|---|---|
| Net output, mW | 750 | 750 | 750 | 750 |
| Heat rate, BTU/kWh | 8650 | 7900 | 5600 | 5350 |
| Efficiency, % | 43% | 45% | +55% | 63% |
| Generation, mW × 10^6 | 6.4 | 6.4 | 6.3 | 6.4 |
| Variable Fuel Cost, $/mWh | 14 | 14 | 10 | 27 |

1. Advance coal and IGCC comparative values based on typical industry data. HINT and NIGHT values calculated.
2. IGCC unit includes 2 gas turbines and 1 steam turbine.
3. HINT natural gas fired, provided for comparative purposes.

While the variable fuel costs for the coal fueled facilities are impressive, the net cost of electricity would be much higher owing to the significant capital investment required for all of the above coal facilities. However, emission levels from the gas turbine based technologies would all be much lower than those of pulverized coal facilities. In particular, the CO2 emissions from the present invention's coal gasification configuration may be approximately 45 percent of those of comparable IGCC plants and about 45 percent of those from comparable conventional pulverized coal power plants. The IGCC emissions are about 70 percent of those from conventional coal plants.

Figure 4B:
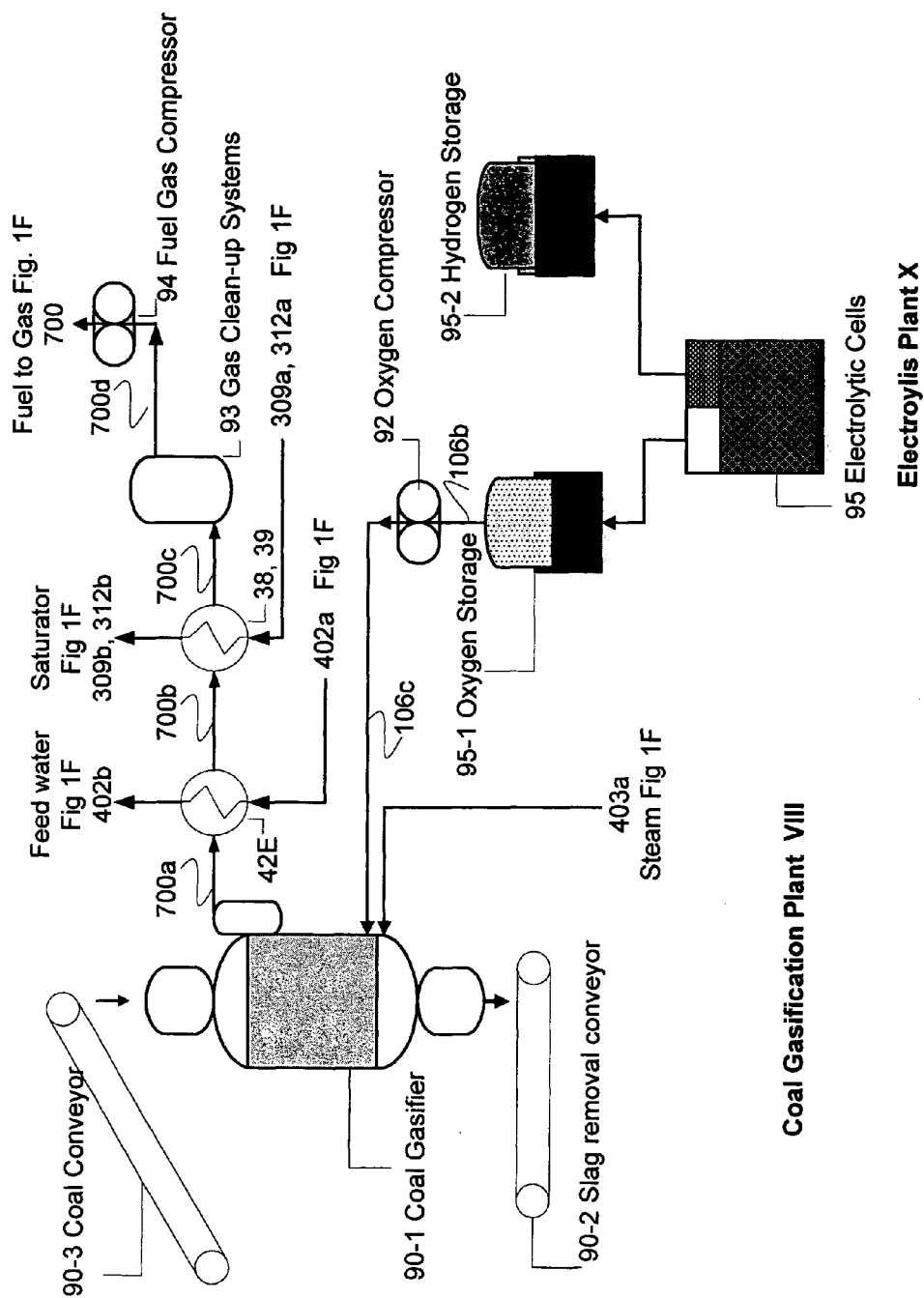

As depicted by 1F and FIG. 4b, an advanced adaptation of the present invention involves co-production of hydrogen and electricity from a coal gasification facility. FIG. 4b provides a simplified illustration of an advanced Nuclear Integrated Gasification Hybrid Turbine where the air Separation Plant IX is replaced by an Electrolysis Plant X. Oxygen and hydrogen are produced by electrolytic cells 97 and stored in vessels 97A and 97B, with the oxygen being used with the coal gasification process. The auxiliary load to produce sufficient quantities of oxygen may be high (over half the output of the facility when using conventional electrolytic cells). However, with the advent of more advance electrolytic production methods (for instance, high temperature processes using reactor 1), the resulting advanced Nuclear Integrated Gasification Hybrid Turbine plant may become a major source for hydrogen and power.

Operationally the hybrid integrated nuclear turbine system behaves quite differently from a conventional combined cycle power plant. Because the gas turbine of a combined cycle plant is connected to a constant speed generator, reducing power levels requires choking back air flow using dampers and/or reducing firing temperatures, both of which degrade efficiency. The hybrid integrated nuclear turbine power plant relies on changing the speed of the nuclear turbine to alter the speed of the air compressors, thus reducing the mass flow of the air stream to the gas turbine. This is accomplished using an accumulator to withdraw helium from the reactor plant. Because temperatures remain relatively constant, efficiency impacts are minimized. Power can also be reduced by altering the flow of hot water to the saturator. Since power output is proportional to the cube of the speed or flow, maneuvering capabilities should be advanced.

The output and efficiency of a conventional gas turbine both degrade as ambient temperatures rise because less air flows through the engine; the air becomes less dense. However, the HINT power plant compensates for this effect through the use of the Vapor Addition Unit. As ambient temperatures rise, the water pumped into the saturator becomes hotter, thereby increasing the mass of the water vapor added to the compressed air.

Start-up of a combined cycle plant involves spinning up the gas turbine (e.g., using the generator as a motor) and igniting the fuel air mixture at the appropriate speed, with further speed increases occurring by increasing air flow and firing temperatures until the 3600 rpm synchronous speed of the generator is reached. This can occur quite rapidly (half hour or so). Steam turbine operations occur as the HRSG creates sufficient steam to allow for gradual heating the turbine by increasing steam flow. These operations can take several hours from cold conditions.

In the case of start-up of the HINT plant, a clutch is engaged to allow the main generator to bring the nuclear turbine and compressors up to operational speeds, with the reactor's control rods moved outward so nuclear energy can heat-up the helium gas. Pressurized air is simply vented from the Compressor Plant until stable reactor conditions are reached. At this point, the start-up is similar to that of a NGCC, although operation of the steam turbine can occur rapidly owing to the small size of the unit.

Shutdown of a NGCC plant can occur quickly, although the process typically occurs in a controlled manner to avoid undue stress on the power plant. In the case of the HINT, the gas turbine load can be similarly reduced, although the reactor would normally be shutdown in a steady controlled fashion using the main generator as a motor. During this period, the compressor plant would discharge air to the atmosphere and gas turbine as the nuclear turbine spins down.

Conventional pressurized water nuclear reactors contain a number of defense-in-depth features to provide a high level of safety. However, owing to the large size (3800 mW thermal and 1300 mW electrical output) of these power stations, operator intervention as well electrical power for active operation of cooling pumps and fans is required to insure that the reactor core does not overheat. Additionally, massive steel and concrete structures are required to contain the energy and radioactive materials that could escape from the reactor in the event of a major accident. The net effect is a very high capital cost for these facilities—several billions of dollars. By contrast, the capital cost of combined cycle plants is in the hundreds of millions of dollars range.

The unique features of a HINT power plant allow the technology to provide an exceptionally high level of safety at capital costs more consistent with those of NGCC plants. The most significant safety feature is that virtually no actions are necessary to prevent the reactor core from melting. The small size of the reactor coupled with the inherent characteristics of the reactor core allows heat to be conducted into surrounding structures.

A key safety feature of the core is the use of refractory coated fuel particles composed of pyrolytic carbon, silicon carbide and uranium oxycarbide. This material has been extensively tested and possesses exceptional resistant to high temperatures. The core has a tremendous heat capacity that allows energy to be dissipated into surrounding structures over time without melting the fuel. In addition, the core has a negative coefficient of reactivity which means that reactor will shut down if temperatures become too high. The Chernoble accident demonstrates the consequences of a positive coefficient of reactivity.

While the HINT technology can ultimately rely on completely passive systems for protection, economic considerations suggest a more active approach. To that end, several different measures provide for routine and emergency removal of reactor decay heat:

Generator/motor. If off-site power is available, the main generator can be used as a motor and the main clutch engaged to rotate the compressors and turbines, with reactor decay heat removed through the inter-coolers to the heat sink or alternatively through the saturators to the atmosphere.

Diesel/generator. If no off-site electrical power is available, the diesel motor/generator can be engaged through a clutch (and reduction gear) to rotate the compressors and turbines as well as supply emergency electrical power. Reactor decay heat would be removed through the inter-coolers or saturators.

Reactor Cavity Cooling A passive system, similar to that planned for the GT-MHR would be employed to remove reactor decay heat by conduction using the natural circulation of air through the cavity surrounding the reactor vessel. Although a passive system, dampers must be opened to activate the system.

Additional protective measures include:

Locating the reactor complex underground.

Providing a concrete and steel structure around the reactor plant.

Providing a concrete protective structure around the turbine and compressor plants.

Providing multiple sources of electrical power.

These features are aimed primarily at protecting the investment from natural and man-made disasters.

A major challenge to a gas cooled reactor can involve the loss of the generator's electrical load. Severe thermal stresses can occur while dissipating the large quantities of reactor heat that is present. However, the reactor of a HINT technology plant could reduce power in a controlled fashion, with the Compressor Plant simply discharging air to the atmosphere.

Environmental Characteristics

The HINT technology possesses a number of desirable traits from an air pollution standpoint, in part because approximately 35% of the energy produced is virtually emissions flee. A relative comparison between comparable HINT and NGCC power plants is provided below.

HINT and NIGHT technology emissions are small fractions of the air pollution emitted by a comparable coal fired power plant. Nitrogen oxide emissions are expected to be in the single digit range (on a parts-per-million basis), as has been observed with advanced turbine cycles that combust large quantities of steam with the fuel gas and air. When coupled with conventional catalysts used for additional NOx and CO reduction, the HINT technology should achieve low $NO_x$ emissions.

The estimated HINT emission levels include no credit for the scrubbing action that will occur in the Water Recovery Unit. Particulates, $CO_2$, $SO_2$ will all be removed from the exhaust gas to varying degrees. As such, the condensate would normally be expected to be quite acidic. However, ammonia (which is used with NOx catalysts) can neutralize the solution, as has been observed in the field.

Recovered water will require treatment, including possibly reverse osmosis and demineralization to remove potential gas turbine contaminants. In addition, cooling tower blow-down water will contain impurities. However, the net level of water borne impurities associated with a HINT will be less than comparable NGCC, coal fired and nuclear power plants. This occurs because the overall thermal pollution levels (a measure of water use) are much smaller.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A power generation system comprising:
  a reactor plant presenting a closed-system Brayton regenerated gas turbine cycle, said reactor plant having:
    a nuclear reactor heating a first working gas,
    a gas turbine receiving the heated first working gas from said nuclear reactor producing a mechanical output and an exhaust,
    a plurality of gas compressors, rotated by said gas turbine, and receiving said first working gas from said exhaust of said gas turbine pressurizing said first working gas and returning said first working gas to said nuclear reactor,
    a recuperator coupled between said gas compressors and said nuclear reactor preheating said first working gas directed into said nuclear reactor,
    a plurality of heat exchangers cooling said heated first working gas exhausted from said gas turbine prior to entry of said first working gas to said gas compressors, said heat exchangers being connected between said gas turbine and said gas compressors conveying said first working gas there through starting with said nuclear reactor, through said gas turbine, said recuperator, said heat exchangers, said gas compressors, said heat exchangers, said plurality of gas compressors, said recuperator and back to said nuclear reactor,
  an air compressor plant having a plurality of air compressors coupled to said gas turbine of said nuclear reactor raising a pressure of a second working gas, a plurality of heat exchangers coupled to said air compressors removing thermal energy from said second working gas prior to entry of said second working gas into said air compressors,
  a turbine plant having a combustion turbine employing fuel ignited in a combustor, said combustion turbine coupled to said compressors of said compressor plant receiving said second working gas therefrom, said combustion turbine and said air compressors of said compressor plant comprising an open-system Brayton combustion turbine cycle,
  a vapor addition unit having a vessel mixing compressed air from said compressor plant with heated water from said plurality of heat exchangers removing heat from said closed-system Brayton gas turbine cycle and said open-system Brayton combustion turbine cycle, thereby adding moisture by way of evaporation of said heated water into said compressed air of said compressor plant, and pumps circulating water removing heat from said open and closed system Brayton cycles, with said compressed air and vapor directed to said combustion turbine of said open-system Brayton combustion turbine cycle, said vapor with said combustion turbine forming a portion of a first Rankine steam cycle,
  a heat recovery unit having a plurality of heat exchangers removing thermal energy from combustion gas exhausted from said turbine plant combustion turbine creating steam, heating water for said vapor addition unit and heating said compressed air and said vapor prior to entry of said air vapor mixture to said combustion turbine of said turbine plant, a steam turbine using said steam generated by said heat recovery unit forming a second Rankine steam cycle, said second Rankine steam cycle and said open-system Brayton combustion turbine cycle comprising a combined cycle, and an electrical plant having a first electrical generator driven by said combustion turbine of said turbine plant and acting as a motor during plant startup, shut down and emergency cooling of said nuclear reactor, and a second electrical generator coupled to said steam turbine, whereas said power generating system provides an integrated coupled multi-cycle and multi-fuel system including said closed-system nuclear reactor heated Brayton regenerated gas turbine cycle coupled to said open-system Brayton regenerated combustion turbine cycle by way of said second working gas from said air compressor of said compressor plant of said open-system Brayton combustion turbine cycle, said second Rankine steam cycle coupled to said open-system Brayton combustion turbine cycle by way of said steam turbine using steam heated by waste heat exhausted from said combustion turbine and said first Rankine steam cycle coupled to said open-system Brayton combustion turbine cycle by way of said vapor addition unit coupled to a plurality of heat exchangers, employed throughout the power generating system, removing heat from said Brayton and Rankine cycles.

2. The power generation system set forth in claim 1 wherein said reactor plant further includes an accumulator controlling said closed and open system Brayton cycles, coupled between said gas compressor and said recuperator.

3. The power generation system set forth in claim 1 wherein said heat recovery unit further comprises duct burners coupled to said exhaust gas from said turbine plant combustion turbine.

4. The power generation system set forth in claim 1 wherein said turbine plant combustion turbine is cooled by the steam exhaust from said steam turbine.

5. The power generation system set forth in claim 1 wherein said turbine plant further comprises a steam accumulator coupled to the exhaust of said steam turbine.

6. The power generation system set forth in claim 1 further comprising a diesel and motor generator coupled to said reactor plant gas turbine and gas compressors, said diesel and motor generator providing emergency power and power generation system start-up.

7. The power generation system set forth in claim 1 further comprising a water recovery unit coupled to said turbine plant combustion turbine exhaust condensing water vapor in said combustion turbine exhaust for reuse.

8. The power generation system set forth in claim 7 wherein said condensed water vapor is neutralized minimizing corrosion of materials.

* * * * *